United States Patent
Long et al.

(10) Patent No.: US 12,541,004 B2
(45) Date of Patent: Feb. 3, 2026

(54) LASER RADAR INTEGRATED BOX, CLEANING DEVICE, AND VEHICLE

(71) Applicant: WUHAN LOTUS CARS CO., LTD, Hubei (CN)

(72) Inventors: Xiange Long, Hubei (CN); Shichao He, Hubei (CN); Qunxiong Wei, Hubei (CN); Zhenfeng Xiong, Hubei (CN); Yucheng Zhu, Hubei (CN); Wenjin Liu, Hubei (CN)

(73) Assignee: WUHAN LOTUS CARS CO., LTD, Hubei (CN)

( * ) Notice: Subject to any disclaimer, the term of this patent is extended or adjusted under 35 U.S.C. 154(b) by 136 days.

(21) Appl. No.: 18/388,843

(22) Filed: Nov. 12, 2023

(65) Prior Publication Data
US 2024/0077576 A1    Mar. 7, 2024

Related U.S. Application Data

(63) Continuation of application No. PCT/CN2022/092298, filed on May 11, 2022.

(30) Foreign Application Priority Data

May 12, 2021   (CN) .......................... 202121015524.X
Oct. 9, 2021   (CN) .......................... 202111175698.7
(Continued)

(51) Int. Cl.
*G01S 7/02* (2006.01)
*B60R 11/04* (2006.01)
(Continued)

(52) U.S. Cl.
CPC .............. *G01S 7/027* (2021.05); *B60R 11/04* (2013.01); *B60S 1/52* (2013.01); *B60S 1/56* (2013.01);
(Continued)

(58) Field of Classification Search
CPC ...... G01S 7/027; G01S 13/865; G01S 13/867; G01S 2007/4977; B60R 11/04; B60S 1/52; B60S 1/56
(Continued)

(56) References Cited

U.S. PATENT DOCUMENTS 4,811,763 A * 3/1989 Kupske .................. B60K 15/04
                                                  141/285
9,840,193 B1 * 12/2017 Chea ........................ B60Q 3/68
(Continued)

FOREIGN PATENT DOCUMENTS

CN    104736394 A    6/2015
CN    209556485 U   10/2019
(Continued)

OTHER PUBLICATIONS

Chinese Intellectual Property Office (ISR/CN), "International Search Report for PCT/CN2022/092298", China, Aug. 17, 2022.
(Continued)

*Primary Examiner* — Peter N Helvey
(74) *Attorney, Agent, or Firm* — troutman pepper locke; Tim Tingkang Xia, Esq.

(57) ABSTRACT

A laser radar integrated box at least includes an outer housing (A10), a lifting device (A20), a laser radar (A40), a controller (A50), and a lower cover plate (A60); the lifting device (A20), the laser radar (A40), and the controller (A50) are located between the outer housing (A10) and the lower cover plate (A60); the laser radar (A40) is located above the lifting device (A20); and the lifting device (A20) can extend or retract under the control of the controller (A50) to drive the laser radar (A40) to extend to the outside of an automobile or retract to the inside of the automobile. The laser (Continued)

radar integrated box can be flexibly arranged on the roof of a vehicle. Further disclosed are a cleaning device and a vehicle.

14 Claims, 15 Drawing Sheets

(30) Foreign Application Priority Data

| Oct. 9, 2021 | (CN) | 202111175708.7 |
|---|---|---|
| Oct. 9, 2021 | (CN) | 202111177139.X |
| Oct. 13, 2021 | (CN) | 202111192613.6 |
| Oct. 13, 2021 | (CN) | 202122464208.7 |
| Oct. 13, 2021 | (CN) | 202122466244.7 |
| Oct. 13, 2021 | (CN) | 202122466412.2 |
| Oct. 13, 2021 | (CN) | 202122466424.5 |
| Oct. 13, 2021 | (CN) | 202122466427.9 |
| Oct. 13, 2021 | (CN) | 202122471685.6 |
| Oct. 13, 2021 | (CN) | 202122481286.8 |
| Apr. 1, 2022 | (CN) | 202220759972.9 |

(51) Int. Cl.
*B60S 1/52* (2006.01)
*B60S 1/56* (2006.01)
*G01S 13/86* (2006.01)
*G01S 7/497* (2006.01)
*G01S 17/50* (2006.01)

(52) U.S. Cl.
CPC .......... *G01S 13/865* (2013.01); *G01S 13/867* (2013.01); *G01S 2007/4977* (2013.01); *G01S 17/50* (2013.01)

(58) Field of Classification Search
USPC ........................................................ 224/314
See application file for complete search history.

(56) References Cited

U.S. PATENT DOCUMENTS

| 2016/0187471 | A1  | 6/2016  | Fendt |
|---|---|---|---|
| 2020/0238910 | A1* | 7/2020  | Wilson ..................... H04N 7/18 |
| 2020/0355808 | A1* | 11/2020 | Albuquerque .......... B60S 1/544 |
| 2021/0253068 | A1* | 8/2021  | Baudouin ............... B60S 1/544 |

FOREIGN PATENT DOCUMENTS

| CN | 111007494 A | 4/2020 |
|---|---|---|
| CN | 210652930 U | 6/2020 |
| CN | 111409739 A | 7/2020 |
| CN | 111417886 A | 7/2020 |
| CN | 211718512 U | 10/2020 |
| CN | 111912444 A | 11/2020 |
| CN | 112477768 A | 3/2021 |
| CN | 112498254 A | 3/2021 |
| CN | 212654283 U | 3/2021 |
| CN | 212766015 U | 3/2021 |
| CN | 112711258 A | 4/2021 |
| CN | 113043961 A | 6/2021 |
| CN | 113310015 A | 8/2021 |
| CN | 213903784 U | 8/2021 |
| CN | 113928230 A | 1/2022 |
| CN | 215706204 U | 2/2022 |
| CN | 216034136 U | 3/2022 |
| DE | 102016010441 A1 | 2/2017 |

OTHER PUBLICATIONS

SIPO, "1st CN Office Action and Search Report for CN Application No. 202111175708.7", China.
SIPO, "1st CN Office Action and Search Report for CN Application No. 202111177139.X", China.
SIPO, "2nd CN Office Action and Search Report for CN Application No. 202111177139.X", China.
SIPO, "1st CN Office Action and Search Report for CN Application No. 202111175698.7", China.
SIPO, "2nd CN Office Action and Search Report for CN Application No. 202111175698.7", China.

* cited by examiner

LASER RADAR INTEGRATED BOX, CLEANING DEVICE, AND VEHICLE

CROSS-REFERENCE TO RELATED PATENT APPLICATION

This application is a continuation application of PCT Patent Application No. PCT/CN2022/092298 filed May 11, 2022, which claims priority to and the benefit of Chinese Application No. 202122466424.5 filed Oct. 13, 2021, Chinese Application No. 202122466412.2 filed Oct. 13, 2021, Chinese Application No. 202122481286.8 filed Oct. 13, 2021, Chinese Application No. 202122466427.9 filed Oct. 13, 2021, Chinese Application No. 202111192613.6 filed Oct. 13, 2021, Chinese Application No. 202111175698.7 filed Oct. 9, 2021, Chinese Application No. 202122466244.7 filed Oct. 13, 2021, Chinese Application No. 202220759972.9 filed Apr. 1, 2022, Chinese Application No. 202111175708.7 filed Oct. 9, 2021, Chinese Application No. 202122464208.7 filed Oct. 13, 2021, Chinese Application No. 202111177139.X filed Oct. 9, 2021, Chinese Application No. 202121015524.X filed May 12, 2021, and Chinese Application No. 202122471685.6 filed Oct. 13, 2021, which are incorporated herein in their entireties by reference.

FIELD OF THE INVENTION

The present invention relates to the field of laser radar technologies, and particularly to a laser radar integrated box, a cleaning device, and a vehicle.

BACKGROUND OF THE INVENTION

A laser radar is an important sensor for realizing high-level intelligent driving and automatic driving, and defects of a camera and a millimeter wave radar can be overcome by using the laser radar: compared with the camera, a more true 3D environment can be constructed, and the laser radar does not depend on ambient light; and compared with the millimeter wave radar, the laser radar has a higher resolution and a more accurate object recognition capability.

Currently, the laser radar is limited by a volume of a laser device and an area of a laser emission (receiving) mirror surface, an overall size of the laser radar is larger than overall sizes of the camera and the millimeter wave radar, and so an arrangement of the laser radar on a finished automobile is difficult, and the laser radar is prone to be limited by the arrangement and styling.

BRIEF DESCRIPTION OF THE INVENTION

In view of the above problems, the present invention is made to provide a laser radar integrated box and a vehicle having the same which overcome or at least partially solve the above problems.

In view of this, the present invention provides a laser radar integrated box and a vehicle having the same, which solve the problem that a field of vision of a single laser radar is limited and an environment behind a vehicle cannot be sensed; meanwhile, an attractive styling requirement for a roof is met, and a technological sense of the vehicle is improved; a hidden cleaning system is integrated, thereby improving user experience.

Particularly, a laser radar integrated box according to the present invention at least includes an outer housing, a lifting device, a laser radar, a controller, and a lower cover plate, wherein the lifting device, the laser radar, and the controller are located between the outer housing and the lower cover plate; the laser radar is located above the lifting device; and the lifting device can extend or retract under control of the controller to drive the laser radar to extend to the outside of an automobile or retract to the inside of the automobile.

In an implementation, the lifting device at least includes a driving device and a lifting platform connected with the driving device, the driving device includes a motor, the lifting platform includes a lead screw, a first lifting rod, a second lifting rod and a supporting rod, the first lifting rod and the second lifting rod are crossed and pivotally connected, the lead screw is connected with a lower portion of the first lifting rod and a lower portion of the second lifting rod, the supporting rod is connected with an upper portion of the first lifting rod and an upper portion of the second lifting rod, and the lead screw is in transmission connection with an output shaft of the motor, and can be driven by the motor to increase or decrease a distance between opposite ends of the first lifting rod and the second lifting rod, so as to extend or retract the lifting platform.

In an implementation, the driving device further includes a gear and a rotating shaft, one end of the rotating shaft is connected with the output shaft of the motor, the other end of the rotating shaft is provided with teeth, the gear is provided at one end of the lead screw, the teeth at the other end of the rotating shaft are meshed with the gear on the lead screw, and the lead screw is driven to rotate by the motor.

In an implementation, the lifting platform further includes upper guide blocks and lower guide blocks, upper ends of the first lifting rod and the second lifting rod are pivotally connected with the upper guide blocks, lower ends of the first lifting rod and the second lifting rod are pivotally connected with the lower guide blocks, holes are formed in the upper guide blocks and the lower guide blocks, two ends of the supporting rod penetrate through the holes of the upper guide blocks, one end of the supporting rod is slidably connected with the corresponding upper guide block, two ends of the lead screw penetrate through the holes of the lower guide blocks, and one end of the lead screw is in threaded connection with the corresponding lower guide block.

In an implementation, the laser radar integrated box further includes a cleaning device, the cleaning device is located on two sides of the laser radar, supports are fixed to two ends of the supporting rod, and the supports are connected with the cleaning device and the laser radar.

In an implementation, the cleaning device at least includes a fixed frame, an electromagnetic valve, a nozzle, a connecting portion and a water inlet, the fixed frame is connected with the laser radar, the electromagnetic valve, the nozzle, the connecting portion and the water inlet are arranged on the fixed frame, one end of the electromagnetic valve is connected with the connecting portion, the other end of the electromagnetic valve is connected with the water inlet, a pipeline connected with the water inlet is connected with a water path of a finished automobile, the nozzle is connected with the connecting portion, and the nozzle has an extending and retracting function.

In an implementation, a mirror surface is fixed on one side of the laser radar, the other side of the laser radar is connected with a second wiring harness, and the second wiring harness is connected with an automatic driving domain controller or an advanced assistant driving domain controller.

In an implementation, a waterproof sealing strip is further arranged on a periphery of a top of the outer housing.

In an implementation, the laser radar integrated box further includes a water pan, the lower housing is located in the water pan, a water outlet is further formed in the water pan, and a water pipe connected with the water outlet is connected with the water path of the finished automobile.

The present invention further provides a vehicle including the above laser radar integrated box.

The present invention further provides a radar integrated box integrated on a vehicle, including: a housing mounted on a vehicle body, an accommodating space being defined in the housing; a radar mounted in the accommodating space; a sensor provided in the housing and configured to sense a moving target within a preset range around the vehicle; and at least one light source provided on the housing, connected with the sensor and configured to be controllably turned on when the sensor senses the moving target.

In an implementation, the housing includes: a bottom plate connected with the vehicle, the radar being connected with the bottom plate; a side enclosing plate arranged along a vertical direction of the vehicle, a bottom of the side enclosing plate being connected with the bottom plate, and an opening being formed in the side enclosing plate to expose the radar; and an upper cover plate located on a side of the side enclosing plate facing a roof and connected with a top of the side enclosing plate.

In an implementation, the upper cover plate includes: a top plate; and two inclined plates obliquely arranged on two sides of the top plate respectively and connected with the top plate, the two inclined plates being further connected with the side enclosing plate.

In an implementation, the side enclosing plate includes a cleaning cover plate configured to be openable by being turned over under control; the radar integrated box further includes a cleaning mechanism provided in the housing to controllably extend out of the housing when the cleaning cover plate is opened, so as to clean a mirror surface of the radar.

In an implementation, the side enclosing plate further includes a camera cover plate configured to be openable by being turned over under control; the radar integrated box further includes a camera provided in the housing to controllably extend out of the housing when the camera cover plate is opened, so as to photograph the mirror surface of the radar.

The present invention further provides a vehicle having the above radar integrated box mounted thereon.

The present invention further provides a cleaning device for a radar, including:
  a housing having a liquid channel provided therein, one end of the liquid channel being connected with a water supply device;
  a nozzle provided at an end of the liquid channel apart from the water supply device, at least part of the nozzle being located in the housing, and the nozzle being configured to spray water to a mirror surface of the radar;
  an electromagnetic valve provided on the liquid channel and configured to open or close the liquid channel under control, so as to allow the cleaning device to be in a water spraying state or an off state; and
  a water pump connected with the liquid channel and configured to be started cooperatively when the electromagnetic valve is opened, so as to drive liquid of the liquid channel to flow and allow the liquid to be sprayed out of the nozzle.

In an implementation, the nozzle is configured to be extendable and retractable so that it is located in the housing when the cleaning device is in the off state, and at least part of the nozzle extends out of the housing when the cleaning device is in the water spraying state.

In an implementation, a sliding block is provided on the nozzle, and a sliding groove fitted with the sliding block is formed in the housing, such that the sliding block slides along the sliding groove when a water pressure in the liquid channel reaches a preset water pressure, thereby causing the nozzle to extend out of the housing.

In an implementation, a plurality of water spraying holes are formed in a side of the nozzle apart from the liquid channel, such that the liquid flowing out of the liquid channel is sprayed out from the plurality of water spraying holes.

In an implementation, the cleaning device further includes a control unit fixedly connected with the housing, connected with the electromagnetic valve and configured to control the electromagnetic valve to be opened or closed.

In an implementation, the cleaning device further includes a detection unit connected with the control unit and configured to detect whether an outer surface of the radar is dirty.

The present invention further provides a radar system for a vehicle, the radar system being provided with a radar and the above cleaning device.

In an implementation, two cleaning devices are provided, and the two cleaning devices are arranged on two sides of the radar respectively.

The present invention further provides a vehicle having the above radar system mounted thereon.

Particularly, the present invention further provides a vehicle-borne radar system, including:
  a radar assembly including a radar;
  a driving mechanism connected with the radar assembly and configured to controllably drive the radar assembly to rotate or lift relative to a vehicle body, so as to expose an emission end of the radar outside a vehicle or hide the radar assembly in the vehicle; and
  a cleaning unit configured to controllably extend out when the emission end is exposed out of the vehicle and spray cleaning liquid to a mirror surface of the emission end.

In an implementation, the radar assembly further includes a radar box, a first opening and a second opening are formed in a side of the radar box where the emission end of the radar is, the first opening is configured to expose the emission end, and the second opening is configured to provide an extending/retracting passage for the cleaning unit.

In an implementation, the cleaning unit includes:
  a washing kettle configured to store the cleaning liquid;
  a washing pump connected with the washing kettle through a first water pipe and configured to pump out the cleaning liquid in the washing kettle;
  an extendable and retractable cleaning actuator provided in the radar box and including a nozzle connected with the washing pump through a second water pipe, the nozzle being configured to spray the cleaning liquid to the mirror surface, and the second water pipe being provided with an electromagnetic valve configured to control opening or closing of the second water pipe; and
  a cover plate connected with the nozzle, matched with the second opening and configured to close the second opening when the cleaning actuator retracts into the inside of the radar box.

In an implementation, a first sealing strip is provided on a periphery of the cover plate and configured to seal the cover plate and the second opening.

In an implementation, the vehicle-borne radar system further includes an analog-to-digital converter as well as a central electronic module and an integrated box controller connected with the analog-to-digital converter, the analog-to-digital converter is further connected with the radar, the radar is configured to send an analog signal to the analog-to-digital converter when the mirror surface is detected to be dirty, the analog-to-digital converter processes the analog signal into a digital signal and then sends the digital signal to the central electronic module and the integrated box controller, the central electronic module is configured to generate a first control signal according to the digital signal and send the first control signal to the washing pump, so as to control the washing pump to work, and the integrated box controller is configured to generate a second control signal according to the digital signal and send the second control signal to the electromagnetic valve, so as to control the electromagnetic valve to be opened.

In an implementation, the integrated box controller is further connected with the driving mechanism and configured to control an action of the driving mechanism, and the analog-to-digital converter is further connected with an infotainment host of the vehicle through an in-vehicle gateway, such that when the infotainment host receives a signal for starting an intelligent driving function, the integrated box controller controls the driving mechanism to drive the radar assembly to act, so as to expose the emission end of the radar outside the vehicle.

In an implementation, the vehicle-borne radar system further includes a sealing structure including:
 a mounting support fixedly connected with the vehicle body; and
 a second sealing strip connected with the mounting support and located between the radar box and a third opening of the vehicle body, the radar box having a shape matched with a shape of the third opening and moving out of the vehicle through the third opening.

In an implementation, the sealing structure further includes:
 a soft sealing film provided around the radar box, two ends of the sealing film being connected with a side wall of the radar box and a lower side of the mounting support respectively; and
 a water outlet penetrating through the sealing film, a side of the water outlet apart from the radar box being communicated with a drain pipe of the vehicle.

In an implementation, the vehicle-borne radar system further includes:
 a fixed bottom plate having a bottom fixedly connected with the vehicle body and an edge provided with a plurality of connecting arms extending upwards, the connecting arms being connected with a bottom of the mounting support; and
 a fixed base provided at the fixed bottom plate and configured to place the cleaning unit and a driving source of the driving mechanism.

Particularly, the present invention further provides a vehicle including the vehicle-borne radar system according to any one of the above descriptions.

Particularly, the present invention further provides a turnover radar integrated box provided at a preset opening of a target vehicle body, including:
 a tray connected with the target vehicle body and located below the preset opening;
 a protective shell matched with the preset opening, a side of the protective shell facing the inside of a vehicle being fixedly connected with a radar;
 a mounting fixed base fixed at the tray and pivotally connected with the protective shell or the radar; and
 a rotating mechanism mounted at the mounting fixed base and configured to controllably drive the radar and the protective shell to rotate relative to the mounting fixed base, so as to expose the radar outside the vehicle or hide the radar in the vehicle.

In an implementation, the turnover radar integrated box further includes an outer sealing assembly including an outer sealing support and an outer sealing strip, the outer sealing support is hermetically connected with the target vehicle body and configured to mount the outer sealing strip, and the outer sealing strip is located between the protective shell and the target vehicle body and configured to seal a gap between the protective shell and the sealing support.

In an implementation, the outer sealing support includes an annular main body and connecting legs connected with the main body, the main body is hermetically connected with the target vehicle body and fixedly connected with the outer sealing strip, one end of the outer sealing strip abuts against the protective shell, and a bottom end of each connecting leg is connected with the tray.

In an implementation, the main body includes a flat plate portion provided in parallel with the target vehicle body, and the flat plate portion is bonded at the target vehicle body.

In an implementation, the main body further includes a vertical clamping portion configured to clamp the outer sealing strip, the vertical clamping portion is connected to a side of the flat plate portion close to the protective shell and is perpendicular to the flat plate portion, a bent portion pointing to the flat plate portion is formed at the preset opening of the target vehicle body, the flat plate portion abuts against the bent portion, and a vertical portion is located between the bent portion and the protective shell.

In an implementation, the turnover radar integrated box further includes a flexible waterproof film provided between a bottom of the main body and an outer side of the protective shell and configured to form a sealed space between the main body and the protective shell.

In an implementation, the protective shell is further provided with a water flowing pipe, the water flowing pipe is communicated with the sealed space and located at a lowest position of the sealed space, and the water flowing pipe is communicated with a drain pipe of the vehicle through a hose.

In an implementation, the target vehicle body is a roof of the vehicle, and the tray is connected to a roof crossrail assembly of the vehicle by fasteners.

Particularly, the present invention further provides a vehicle including the turnover radar integrated box according to any one of the above descriptions.

Particularly, the present invention further provides a hidden vehicle-borne radar mounting assembly provided at a mounting opening of a vehicle body, including:
 a fixed assembly connected with the vehicle body and configured as a recess;
 a radar enclosure provided in the recess and pivotally connected to the fixed assembly, an accommodating space for placing a radar being provided in the radar enclosure, a window for revealing the radar being provided on a side wall of the radar enclosure, and the radar enclosure being configured to form a closed state where the radar enclosure is hidden in the recess and an open state where the window of the radar enclosure is completely exposed out of the recess when the radar enclosure rotates relative to the fixed assembly; and a sealing assembly including a flexible sealing film, the sealing film being provided around the radar enclosure and having one side hermetically connected with a target vehicle body directly or indirectly and the other side hermetically connected with an outer side of the radar enclosure, so as to form a sealed water storage space between the target vehicle body and the radar enclosure, the target vehicle body being a vehicle body part on a peripheral side of the mounting opening, and a lowest position of the sealing film when the radar enclosure is in the closed state being communicated with a drain pipe of a vehicle, so as to drain liquid in the water storage space.

In an implementation, the sealing assembly further includes a sealing strip provided around the radar enclosure and between the target vehicle body and the radar enclosure.

In an implementation, the sealing assembly further includes a sealing support having one side connected with the target vehicle body and the other side configured to fix the sealing film.

In an implementation, the sealing support is bonded to a bottom of the target vehicle body by double-sided adhesive tape.

In an implementation, an annular flange extending out from an outer wall of the radar enclosure is provided at the outer wall of the radar enclosure, and two ends of the sealing film are connected with the sealing support and the annular flange respectively.

In an implementation, a height of a side of the outer wall of the radar enclosure provided with the window is larger than that of the opposite side, and the annular flange is provided at a bottom of the outer wall of the radar enclosure.

In an implementation, a drainage duct communicated with the water storage space and the drain pipe is formed in the radar enclosure, and the sealing film is provided with a channel through which the drainage duct passes.

In an implementation, the fixed assembly includes:
a fixed bottom plate; and
a plurality of connecting supports, two ends of each connecting support being connected with the target vehicle body and a periphery of the fixed bottom plate respectively.

In an implementation, the fixed bottom plate includes:
a flat plate portion; and
a plurality of connecting legs located at a periphery of the flat plate portion, each connecting leg extending towards the target vehicle body and being connected with the connecting support.

Particularly, the present invention further provides a vehicle including the hidden vehicle-borne radar mounting assembly according to any one of the above descriptions.

Particularly, the present invention further provides a mounting device for a vehicle-borne radar, which is mounted at a preset mounting opening of a vehicle body and includes:
a fixed structure fixedly provided on a side of the vehicle body close to the inside of a vehicle and forming a sunken mounting space together with the mounting opening;
a radar cover shell provided on a top surface of the vehicle-borne radar, fixedly connected with the vehicle-borne radar and configured to protect the vehicle-borne radar, the radar cover shell being matched with the mounting opening; and
a driving assembly configured to drive the radar cover shell and the vehicle-borne radar to move or rotate together, so as to form a use state where the vehicle-borne radar is exposed outside the vehicle and an emission end of the vehicle-borne radar is not shielded, or a closed state where the vehicle-borne radar is hidden inside the vehicle.

In an implementation, the vehicle-borne radar has one side pivotally connected with the vehicle body, such that the vehicle-borne radar can rotate relative to the vehicle body about a target pivot axis, the vehicle-borne radar has a mounting side surface perpendicular to the target pivot axis, and the driving assembly includes:
a movable sliding block configured to be reciprocally movable along a first straight line parallel to the mounting side surface;
a connecting rod having one end hinged to the movable sliding block through a first hinge shaft and the other end provided with a second hinge shaft; and
a cam plate fixedly connected with the mounting side surface and provided with a moving sliding groove, an included angle between an extending direction of the moving sliding groove and the first straight line being an acute angle, and the second hinge shaft being located in the moving sliding groove.

In an implementation, the driving assembly further includes a first power source connected with the movable sliding block and configured to drive the movable sliding block to reciprocate along the first straight line.

In an implementation, the driving assembly further includes:
a lead screw extending along the first straight line and in lead screw pair connection with the movable sliding block; and
a second power source connected with the lead screw and configured to drive the lead screw to rotate, so as to drive the movable sliding block to move relative to the lead screw.

In an implementation, the mounting device further includes a soft inner sealing film having one side hermetically connected with a periphery of the radar cover shell and the other side hermetically connected with a bottom of the vehicle body at the mounting opening, so as to form a sealed space between the radar cover shell and the vehicle body, a width of the inner sealing film being configured into a preset size to adapt to a stroke change of rotation or movement of the radar cover shell.

In an implementation, the vehicle-borne radar, the fixed structure and the driving assembly are all located at a lower portion of the inner sealing film or a side apart from the radar cover shell.

In an implementation, a lowest position of the inner sealing film when the mounting device is in the use state or the closed state is provided with a water outlet communicated with the outside.

In an implementation, the mounting device further includes an extendable and retractable connecting pipe having two ends communicated with the water outlet and a drainage system of the vehicle respectively.

In an implementation, the mounting device further includes an outer sealing strip fixedly provided at an edge of the mounting opening and having one side abutting against the radar cover shell when the mounting device is in the closed state.

In an implementation, the mounting device further includes a mounting support provided on an inner side of the vehicle body at the mounting opening and hermetically connected with the vehicle body, a side of the mounting support apart from the vehicle body being connected with the inner sealing film, and an end of the mounting support close to the radar cover shell being configured to fix the outer sealing strip.

Particularly, the present invention further provides a turnover radar device mounted at a preset mounting opening of a vehicle body, including:

a radar box configured to place a radar therein and located at the mounting opening; and a driving assembly including a driving source, a lifting rod and a supporting arm, one end of the lifting rod being hinged to a target side wall of the radar box, the driving source being configured to drive the lifting rod to move along a preset direction, so as to push the radar box to move towards the outside of a vehicle at a hinged point of the lifting rod and the radar box, and the supporting arm having one end hinged to the vehicle body and the other end hinged to the target side wall and being configured to lift the radar box to extend out of the mounting opening together with the lifting rod.

In an implementation, the driving assembly further includes a lead screw sleeve fixedly connected with the target side wall, the lifting rod is a lead screw connected with the lead screw sleeve through a lead screw pair, the driving source is a first motor outputting a torque, and the first motor is connected with the lead screw and configured to drive the lead screw to rotate.

In an implementation, the hinged point of the lifting rod and the target side wall and a hinged point of the supporting arm and the target side wall are located on both sides of the target side wall in a lateral direction respectively.

In an implementation, two supporting arms are provided at the target side wall and a side wall of the radar box opposite the target side wall respectively and aligned with each other.

In an implementation, the driving source is a second motor for outputting a linear motion, and is configured to drive the lifting rod to move in the preset direction.

In an implementation, the turnover radar device further includes a fixed base fixedly connected with the vehicle body and configured to place the driving source.

In an implementation, the radar box has a first side surface and a second side surface opposite to each other, as well as a third side surface and a fourth side surface opposite to each other, the first side surface is provided with an opening configured to expose an emission end of the radar, and the target side wall is the third side surface or the fourth side surface.

In an implementation, the preset direction is a direction perpendicular to an outer surface of the vehicle body or a vertical direction of the vehicle.

Particularly, the present invention further provides a vehicle including the turnover radar device according to any one of the above descriptions.

In an implementation, the vehicle further includes a radar control system including a switch key, an infotainment host and an electronic control unit which are connected in sequence, the switch key generates a corresponding electric signal in response to an external operation and sends the electric signal to the infotainment host, the infotainment host processes the electric signal into corresponding radar control information and sends the radar control information to the electronic control unit, and the electronic control unit is connected with the driving source and configured to control the driving source to execute corresponding actions according to the radar control information.

Particularly, the present invention provides a lifting vehicle-borne radar device, including:

a radar having a shape matched with a shape of a mounting opening on a target vehicle body, the radar having a radar emission opening on a side surface thereof;

a lifting mechanism connected with the radar and configured to controllably lift the radar to hide the radar in the vehicle body or raise the radar to a preset height through the mounting opening; and a sealing film provided around the radar and having one side connected with an edge of the mounting opening and the other side connected with the radar, a connecting point of the sealing film and a side of the radar having the radar emission opening being located below a bottom of the radar emission opening.

In an implementation, the lifting mechanism includes a driving motor and a transmission mechanism, and the transmission mechanism includes:

a lead screw, the driving motor being configured to drive the lead screw to rotate;

a first sliding block and a second sliding block connected with the lead screw by lead screw pairs;

a first connecting rod having one end hinged to the first sliding block by a first rotating shaft and the other end hinged to a third rotating shaft, the second rotating shaft being slidably provided in a sliding groove in a side surface of the radar, and a length direction of the sliding groove being parallel to an axial direction of the lead screw; and a second connecting rod having a middle hinged to a middle of the first connecting rod through a fourth rotating shaft, the second connecting rod having one end hinged to the second sliding block through a second rotating shaft and the other end hinged to a fourth rotating shaft, the fourth rotating shaft being slidably provided in the sliding groove, and axes of the first rotating shaft, the second rotating shaft, the third rotating shaft and the fourth rotating shaft being perpendicular to a plane where the first connecting rod and the second connecting rod are located.

In an implementation, the sliding groove is provided on an outer side surface of the radar not provided with the radar emission opening.

In an implementation, two transmission mechanisms are provided and symmetrically arranged on two opposite side surfaces of the radar; the lifting mechanism further includes gear assemblies each of which is provided between the lead screw of each transmission mechanism and the driving motor.

In an implementation, two transmission mechanisms and two driving motors are provided, the two transmission mechanisms are symmetrically provided on two opposite side surfaces of the radar, and the two driving motors are connected with the lead screws of the two transmission mechanisms respectively.

In an implementation, the driving motor is connected with a controller of a vehicle.

In an implementation, the sealing film is provided with a drain pipe communicated with the outside.

Particularly, the present invention further provides a vehicle including the lifting vehicle-borne radar device according to any one of the above descriptions.

Particularly, the present invention further provides a liftable radar device for a vehicle, a vehicle body of the vehicle being provided with a vehicle body opening for the liftable radar device to pass through, the liftable radar device including:

a radar assembly including a radar body and a radar housing fixedly connected with the radar body;

a lifting mechanism configured to drive the radar assembly to ascend or descend, so as to realize a use state where the radar assembly is raised to a first height and a mirror surface of the radar body is exposed or a closed state where the radar assembly is lowered to a second height; and a cleaning mechanism configured to clean the mirror surface of the radar body when the radar assembly is in the use state.

In an implementation, the lifting mechanism includes:

two folding arms oppositely provided on a same side surface of the radar housing, each folding arm including a first connecting rod and a second connecting rod which are hinged, the first connecting rod being further hinged to the radar housing, and the second connecting rod being further hinged to the vehicle body; and a driving source configured to drive the two second connecting rods to rotate reversely, so as to drive the radar assembly to ascend or descend.

In an implementation, the driving source is a motor, and the lifting mechanism further includes a gear set having an input end connected with the motor and an output end connected with the two second connecting rods.

In an implementation, each second connecting rod is connected with the vehicle body through a rotating shaft, the rotating shaft is fixedly connected with the second connecting rod, and the rotating shaft can rotate relative to the vehicle body;

the gear set includes a driving gear provided at an output shaft of the motor and a driven gear meshed with the driving gear and having a same number of teeth as the driving gear, the output shaft of the motor is connected with one rotating shaft, and the driven gear is fixedly connected with the other rotating shaft.

In an implementation, the radar housing has a box shape, and one side of the radar housing is provided with a visible window for exposing the mirror surface of the radar body.

In an implementation, an opening is further formed in the side of the radar housing provided with the visible window;

the cleaning mechanism includes an extendable and retractable nozzle provided inside the radar housing corresponding to the opening, and the nozzle is configured to pass through the opening to spray cleaning liquid to the mirror surface.

In an implementation, two openings are provided and arranged on two sides of the visual window respectively.

Particularly, the present invention further provides a vehicle including the liftable radar device according to any one of the above descriptions.

The present invention further provides a radar system for a vehicle, including:

a bottom plate connected with a vehicle body;

a radar box having a radar mounted therein and provided on a side of the bottom plate facing the outside of the vehicle;

a turnover mechanism including a first turnover support and a fixed support, the fixed support having one end fixedly connected with the bottom plate and the other end pivotally connected with the radar box, and one end of the first turnover support being connected with the radar box; and a driving mechanism configured to drive the first turnover support to push the radar box to rotate around a connecting point of the fixed support and the radar box, such that the radar box is switched between an exposed state where the radar is exposed outside the vehicle and a hidden state where the radar is hidden inside the vehicle.

In an implementation, the turnover mechanism further includes a second turnover support having a first end and a second end, the first end is fixedly connected with the radar box and pivotally connected with the fixed support through the connecting point, and the second end is connected with an end of the first turnover support connected with the radar box.

In an implementation, the second turnover support is triangular, and the second turnover support further includes a third end, and the third end is fixedly connected with the radar box.

In an implementation, the first end and the third end are both located on a side of the second end facing a roof.

In an implementation, the turnover mechanism further includes a third turnover support having one end pivotally connected with the first turnover support and the other end connected with the driving mechanism, so as to drive the first turnover support to rotate when the driving mechanism drives the third turnover support to rotate, thereby pushing the radar box to rotate.

In an implementation, the radar system further includes a sealing structure provided along a circumferential direction of the radar box and configured to seal a gap between the radar box and the vehicle body.

In an implementation, the radar system further includes a cleaning mechanism provided inside the radar box and configured to extend out of the radar box when the radar box is in the exposed state, so as to clean the outside of the radar box.

The present invention further provides a vehicle having the above radar system for a vehicle mounted thereon.

Particularly, the present invention further provides a lifting device for a hidden roof laser radar, wherein the lifting device includes a motor and a moving device linked with the motor, the moving device is connected with a radar device, the laser radar is provided in the radar device, and the moving device includes: a driving rod connected with the motor; a first anchoring shaft provided on the radar device and linked with the driving rod; a restraint plate fixedly provided on a radar integrated box bottom plate fixedly connected with a vehicle body, the restraint plate being provided with a restraint strip hole for restraining movement of the first anchoring shaft; and a rotating member having one end hinged to the radar device and the other end hinged to the radar integrated box bottom plate; the driving rod is driven by the motor to push the first anchoring shaft to slide in the restraint strip hole, and meanwhile, the rotating member rotates to raise the radar device to an open position exposed outside a vehicle or lower the radar device to a closed position hidden in the vehicle.

In an implementation, the driving rod is provided with a strip-shaped hole, and the first anchoring shaft is provided in the strip-shaped hole and slides in the strip-shaped hole.

In an implementation, one end of the driving rod is fixedly connected with a transmission shaft and rotatably connected with the radar integrated box bottom plate through the transmission shaft, and the motor is configured to drive the transmission shaft to rotate.

In an implementation, two ends of the restraint strip hole serve as limiting ends, the upper end of the restraint strip hole serves as an opening limiting end, and the lower end of the restraint strip hole serves as a closing limiting end.

In an implementation, the restraint plate is provided between the driving rod and the radar device, and the restraint strip hole has an arc shape.

In an implementation, the radar device is provided with a second anchoring shaft, and the second anchoring shaft is sleeved with the rotating member.

In an implementation, the radar integrated box bottom plate is provided with a rotating shaft, and the rotating shaft is sleeved with the rotating member to rotate the radar device around the rotating shaft.

In an implementation, two moving devices are provided and symmetrically arranged on two opposite sides of the radar device respectively.

The present invention further discloses a radar integrated box including a radar device and the above lifting device for a hidden roof laser radar.

The present invention further discloses a vehicle including the above radar integrated box.

Compared with the prior art, the present invention has the following beneficial technical effects.

According to an embodiment of the present invention, the laser radar integrated box is provided and designed at the roof which is high, and is not easy to be shielded and damaged by collision, the field of vision is wide, and a visual field angle of the laser radar can be expanded to a maximum extent, thus improving an environment perception effect; meanwhile, heat dissipation of the radar during working is realized through natural wind cooling; a hiding function is achieved, and when the laser radar is in a standby state, the laser radar, the lifting device and the cleaning device are all hidden inside the roof, an overall sense and attractiveness of the vehicle are enhanced, and the mirror surface of the laser radar is not prone to contact dirt, such as soil; the active cleaning function of the laser radar is achieved, thereby improving user experience.

According to an embodiment of the present invention, the radar integrated box integrated on a vehicle includes the housing, the radar, the sensor and the at least one light source, the housing is mounted on the vehicle, the accommodating space is defined inside the housing, and the radar is mounted in the accommodating space. The sensor is provided in the housing and configured to sense the moving target within the preset range around the vehicle. The light source is provided on the housing, connected with the sensor and configured to be controllably turned on when the sensor senses the moving target. In the present invention, the light source is additionally provided on the radar integrated box and can be automatically turned on when a user is sensed to be near the vehicle, thereby achieving a welcoming function of the radar integrated box, and improving interestingness of the radar integrated box.

Further, the side enclosing plate in the present invention includes the cleaning cover plate configured to be openable by being turned over under control; the radar integrated box further includes the cleaning mechanism provided in the housing to extend out of the housing when the cleaning cover plate is opened, so as to clean the outside of the housing. In the present invention, the cleaning mechanism is additionally provided on the radar integrated box, such that an automatic cleaning function of the radar integrated box is increased, and the radar integrated box is not required to be cleaned manually.

According to an embodiment of the present invention, the cleaning device for a radar includes the housing, the nozzle, the electromagnetic valve and the water pump, the liquid channel is provided in the housing, and one end of the liquid channel is connected with the water supply device. The nozzle is provided at the end of the liquid channel apart from the water supply device, at least part of the nozzle is located in the housing, and the nozzle is configured to spray water to the mirror surface of the radar. The electromagnetic valve is provided on the liquid channel and configured to open or close the liquid channel under control, so as to allow the cleaning device to be in the water spraying state or the off state. The water pump is connected with the liquid channel and configured to be started cooperatively when the electromagnetic valve is opened, so as to drive the liquid of the liquid channel to flow and allow the liquid to be sprayed out of the nozzle. Therefore, in the present invention, when the radar is required to be cleaned, it only needs to simultaneously start the electromagnetic valve and the water pump, automatic cleaning of the radar can be realized, and manual cleaning after parking is not required, thus guaranteeing continuity of automatic driving.

According to an embodiment of the present invention, the plurality of water spraying holes are formed in the side of the nozzle apart from the liquid channel, such that the liquid flowing out of the liquid channel is sprayed out from the plurality of water spraying holes. The present invention is equivalent to splitting a water spraying hole with a larger cross sectional area into a plurality of water spraying holes with smaller cross sectional areas, which reduces the cross sectional area, thereby increasing a water spraying pressure and further improving a cleaning performance.

According to an embodiment of the present invention, the vehicle-borne radar system can realize the turnover or lifting of the radar assembly relative to the vehicle body, such that the radar can be controlled to extend out of the vehicle for detection work, or hidden in the vehicle, and dust is not prone to be accumulated. In addition, the vehicle-borne radar system further includes the cleaning unit which can clean the mirror surface of the radar, thus further guaranteeing cleanness of the radar, so as to guarantee accuracy of intelligent driving.

Further, the cleaning unit in the present invention includes the cover plate matched with the second opening; that is, the second opening of the radar box can be closed through the structure of the cleaning unit without additionally providing an opening-closing door, such that a structure is simple and a cost is low.

Further, in the present invention, automatic control of a working process of the cleaning unit is realized through communication among the radar, the analog-to-digital converter, the central electronic module and the integrated box controller. The infotainment host of the vehicle is in communication connection with the vehicle-borne radar system, thus realizing automatic control of the movement of the radar assembly.

Further, in the present invention, omnidirectional sealing protection of the vehicle-borne radar system can be realized by providing the first sealing strip, the second sealing strip and the sealing film.

According to an embodiment of the present invention, the turnover radar integrated box is provided and includes the protective shell for fixing the radar, both of the protective shell and the radar can be turned over relative to the fixed mounting fixed base, and the protective shell is matched with the preset opening of the vehicle body, such that a state of an integral appearance of the vehicle body can be formed in the closed state, so as to improve attractiveness and an aerodynamic performance of the vehicle; dust is not prone to be accumulated, and the radar and the protective shell can be controlled to be turned out to an outer side of the vehicle body in use, thereby facilitating adjustment of an angle of the radar.

Further, the turnover radar integrated box according to the present invention further includes the outer sealing assembly, and the outer sealing assembly includes the outer sealing support and the outer sealing strip. The outer sealing support is hermetically connected with the target vehicle body and configured to mount the outer sealing strip. The outer sealing strip is located between the protective shell and the target vehicle body and configured to seal the gap between the protective shell and the sealing support. The arrangement of the outer sealing strip can achieve a sealing effect when the radar integrated box is in the closed state.

Further, in the present invention, a staggered structure formed by the bent portion of the target vehicle body and the vertical clamping portion of the outer sealing support can further achieve the sealing effect in cooperation with the annular adhesive tape between the outer sealing support and the target vehicle body.

Further, the waterproof film is provided between the protective shell and the outer sealing support, such that water can be effectively prevented from flowing into the vehicle, thereby achieving a perfect sealing effect.

Further, the arrangement of the water flowing pipe and the hose can ensure that water in the waterproof film can be discharged through the drainage system of the vehicle, such that water is prevented from being accumulated in the waterproof film. The water flowing pipe is fixedly provided on the protective shell and can thus move with the protective shell, and the water flowing pipe is communicated with the drain pipe of the vehicle by providing the hose, such that a moving condition of the water flowing pipe can be adapted.

According to an embodiment of the present invention, the hidden radar mounting assembly is provided, the radar enclosure with the radar can be turned out of the vehicle when the radar is required to be used, so as to expose the emission end from the window of the radar enclosure, and the radar enclosure is restored to the position inside the vehicle when the radar is not required to be used, thus guaranteeing attractiveness of an appearance of the vehicle.

Further, the radar mounting assembly is further provided with the sealing assembly following the radar enclosure, such that the sealing assembly can adapt to the turnover radar enclosure, so as to achieve a real-time waterproof sealing effect. In addition, since the sealing film of the sealing assembly is communicated with the drain pipe of the vehicle, and the communicated position is the lowest position of the sealing film when the radar enclosure is in the closed state, accumulated water can be drained in the closed state, and the sealing film is prevented from being soaked in water for a long time.

Further, the sealing assembly further includes the sealing strip provided around the radar enclosure between the target vehicle body and the radar enclosure. Due to the arrangement of the sealing strip, when the radar enclosure is in the closed state, the gap between the radar enclosure and the target vehicle body is sealed, a waterproof effect is achieved when the radar is not used, and rainwater or other liquid is prevented from entering the assembly.

According to an embodiment of the present invention, the vehicle-borne radar capable of moving relative to the vehicle body is designed, the driving assembly is provided on the vehicle body and configured to drive the vehicle-borne radar or the radar cover shell to extend out or turn out of the vehicle when the radar is required to be used, and the vehicle-borne radar can be hidden in the vehicle when the vehicle-borne radar is not required to be used, such that the problems that an appearance of a fixed exposed vehicle-borne radar is not attractive, aerodynamics is influenced due to change on a shape of the vehicle, and dust is prone to be accumulated can be solved.

Further, in the present invention, by providing the lead screw forming the lead screw pair connection with the movable sliding block, power output by the second power source can be transmitted to the vehicle-borne radar more stably, and the vehicle-borne radar can be turned over more stably, thus facilitating an increase of user satisfaction.

Further, in the present invention, by providing the inner sealing film between the radar cover shell and the vehicle body, liquid outside the vehicle can be effectively prevented from entering the mounting device or the vehicle, thereby achieving a waterproof effect to protect the radar and parts inside the vehicle.

Further, in the present invention, the outer sealing strip is further provided, such that an effective sealing effect can be achieved when the mounting device is in the closed state, the liquid outside the vehicle is prevented from entering the space between the inner sealing film and the radar cover shell, thus further enhancing the sealing effect. An omnidirectional waterproof effect on the mounting device can be achieved through the cooperation of the outer sealing strip, the inner sealing film and the water outlet.

According to an embodiment of the present invention, the turnover radar device is provided, and the function that the radar on the vehicle extends out of the vehicle or is hidden in the vehicle is achieved through the driving assembly. The specific driving assembly includes the lifting rod driven to ascend or descend by the driving source and the supporting arm for auxiliary supporting, and can lift the radar box for loading the radar relative to the vehicle; the driving assembly has a simple structure, realizes multi-point supporting, can realize and guarantee normal lifting of the radar box, and meets the requirement of providing a hidden radar on the vehicle. The problems of an unattractive appearance, a poor aerodynamic performance, a poor detection angle, dust accumulation, or the like, caused by fixedly mounting the radar on the vehicle are solved.

Further, in the present invention, the lead screw is driven by the first motor to rotate, the rotation of the lead screw is converted into the lifting of the lead screw sleeve through the lead screw pair, and the lead screw sleeve is connected with the radar box, so as to drive the radar box to ascend or descend; the torque of the motor can be stably converted into the lifting of the radar box through the transmission mode of the lead screw pair, and the stable lifting of the radar box is realized in conjunction with the auxiliary lifting function of the supporting arm.

According to an embodiment of the present invention, the radar can be lifted relative to the target vehicle body, and the sealing film is provided and can achieve real-time sealing and waterproof effects in the process of lifting the radar, thus meeting a waterproof requirement of the liftable radar.

Further, in the present invention, transmission is performed through the motor and the lead screw pair, thus guaranteeing lifting stability of the radar; the first connecting rod and the second connecting rod are linked by hinging, thereby achieving a powerful supporting effect on the radar.

According to an embodiment of the present invention, the liftable radar assembly is provided and can extend out of the vehicle body according to use requirements. In addition, the liftable radar device is further provided with the cleaning mechanism dedicated to the radar body, such that the mirror surface of the radar body can be cleaned when the radar assembly is raised, thereby keeping cleanliness of the mirror surface of the radar, ensuring that the radar body can collect clear information, and then facilitating an improvement of precision of intelligent driving, for example, accuracy of vehicle positioning and target object collection.

Further, the lifting mechanism having the two folding arms in the present invention has a simple structure and realizes stable lifting.

Further, in the present invention, power of one motor can be output to the two second connecting rods by providing the gear set, such that the radar assembly can be lifted at a low cost.

According to an embodiment of the present invention, the radar system for a vehicle includes the bottom plate, the radar box, the turnover mechanism and the driving mechanism, the bottom plate is connected with the vehicle body, the radar is mounted in the radar box, and the radar box is provided on the side of the bottom plate facing the outside of the vehicle. The turnover mechanism includes the first turnover support and the fixed support, the fixed support has one end fixedly connected with the bottom plate and the other end pivotally connected with the radar box, and one end of the first turnover support is connected with the radar box. The driving mechanism is configured to drive the first turnover support to push the radar box to rotate around the connecting point of the fixed support and the radar box, such that the radar box is switched between the exposed state where the radar is exposed outside the vehicle and the hidden state where the radar is hidden inside the vehicle. Therefore, in the present invention, the radar box can be in the exposed state when the radar is required to be used, the radar box can be in the hidden state when the radar is not required to be used, attractiveness of the vehicle will not be influenced, and meanwhile, when the radar box is hidden, the radar can be prevented from being stolen, damaged and dirtied.

According to an embodiment of the present invention, the radar system further includes the cleaning mechanism provided inside the radar box and configured to extend out of the radar box when the radar box is in the exposed state, so as to clean the outside of the radar box. The radar system according to the present invention has a cleaning function, and can automatically clean the radar box, thus improving intelligence of the radar system for a vehicle.

According to an embodiment of the present invention, the hidden laser radar can be raised or lowered according to a preset direction by providing the driving rod, the anchoring shaft, the restraint plate and the rotating member, thus ensuring that the laser radar is raised timely in use and can be hidden and protected when not in use.

Further, the lifting device in the present invention has a simple and stable structure through the sleeving and linkage of the driving rod, the anchoring shaft, the restraint plate and the rotating member, thereby reducing a production cost.

It will be appreciated that the various implementations described above may be combined with one another, and the combined solutions also have corresponding beneficial effects.

The foregoing description merely briefly describes the technical solutions of the present invention. To more clearly understand the technical means of the present invention and thus practice the present invention according to content of the specification, and to make the foregoing and other objects, features and advantages of the present invention more comprehensible, particular embodiments of the present invention are described below.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

Figure 1A:
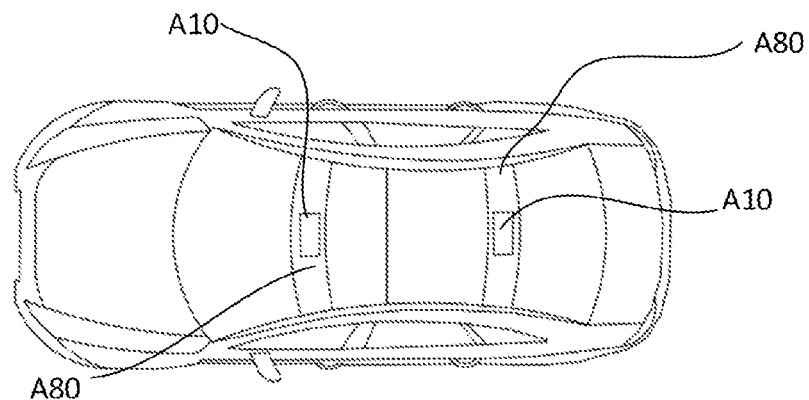
FIG. 1A is a schematic diagram of a mounting position of a laser radar integrated box according to the present invention on a roof.

Reference numerals in FIGS. 1A to 1D: A10—outer housing; A11—sealing strip; A20—lifting device; A21—driving device; A211—motor; A212—gear; A213—rotating shaft; A22—lifting platform; A221—lead screw; A222—first lifting rod; A223—second lifting rod; A224—supporting rod; A225—upper guide block; A226—lower guide block; A227—support; A30—cleaning device; A31—fixed frame; A311—combined structure; A32—electromagnetic valve; A33—nozzle; A34—connecting portion; A35—water inlet; A40—laser radar; A41—mirror surface; A50—controller; A60—lower cover plate; A70—water pan; A71—water outlet; A80—roof.

Figure 2A:
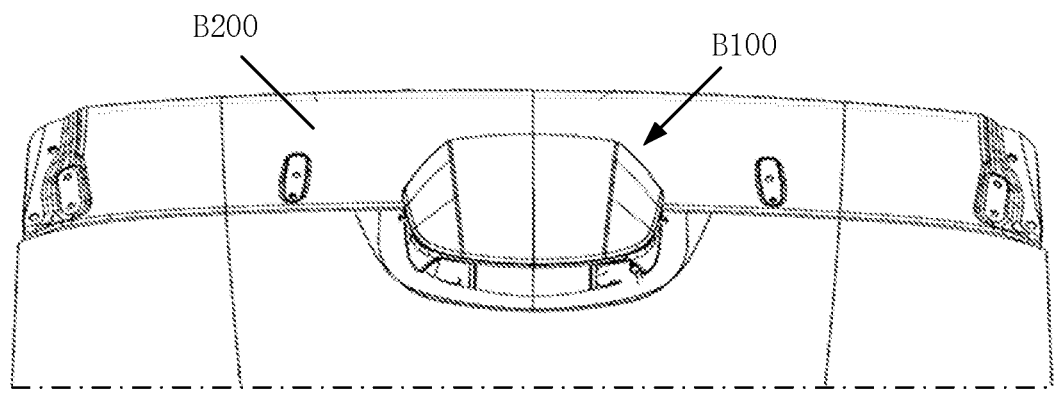
Figure 2B:
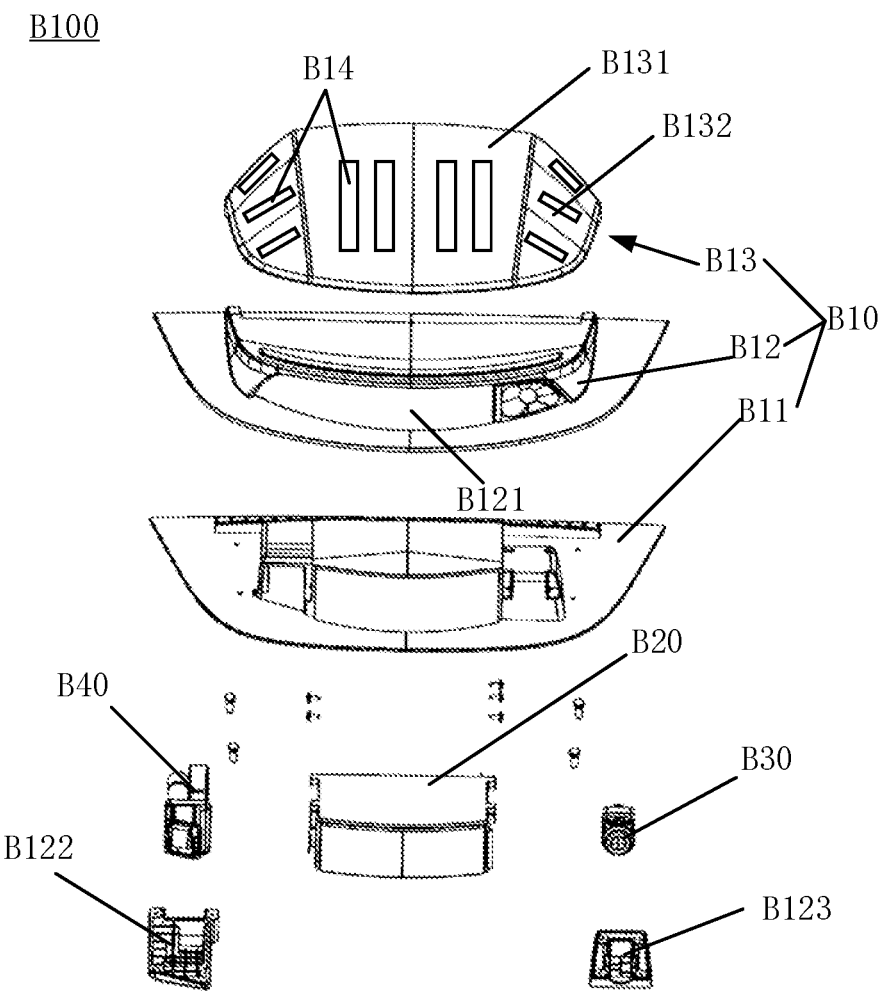

FIG. 2A is a schematic mounting diagram of a radar integrated box according to an embodiment of the present invention and a vehicle body; and FIG. 2B is a schematic exploded diagram of the radar integrated box shown in FIG. 2A.

Reference numerals in FIGS. 2A to 2B: B100—radar integrated box, B200—vehicle body, B10—housing, B20—radar, B30—camera, B40—cleaning mechanism, B11—bottom plate, B12—side enclosing plate, B13—upper cover plate, B14—light source, B131—top plate, B132—inclined plate, B121—opening, B122—cleaning cover plate, B123—camera cover plate.

Figure 3A:
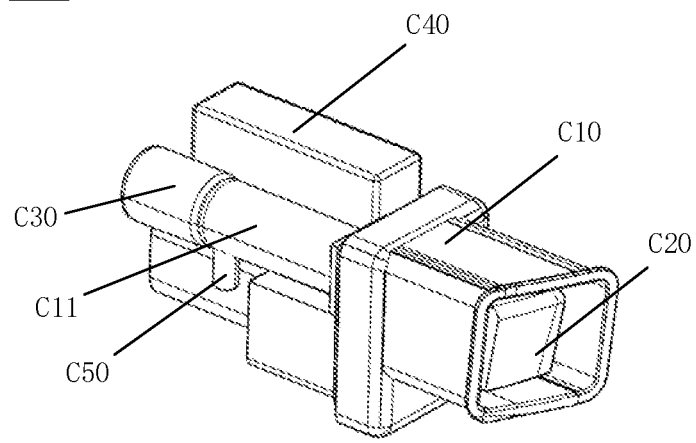
Figure 3B:
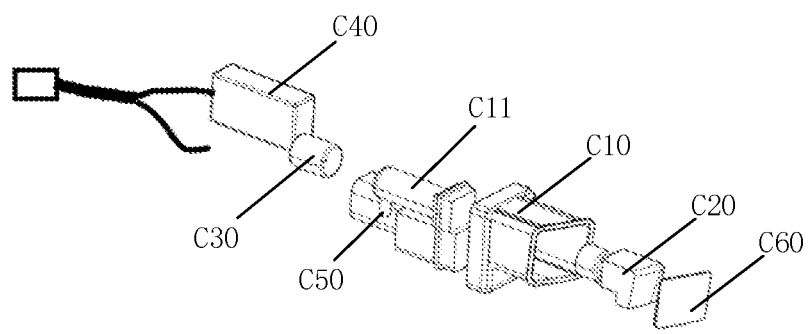

FIG. 3A is a schematic structural diagram of a cleaning device for a radar according to an embodiment of the present invention; and FIG. 3B is a schematic exploded diagram of the cleaning device shown in FIG. 3A.

Reference numerals in FIGS. 3A to 3B: C100—cleaning device, C10—housing, C20—nozzle, C30—electromagnetic valve, C40—control unit, C50—motor, C60—baffle, C11—liquid channel.

Figure 4A:
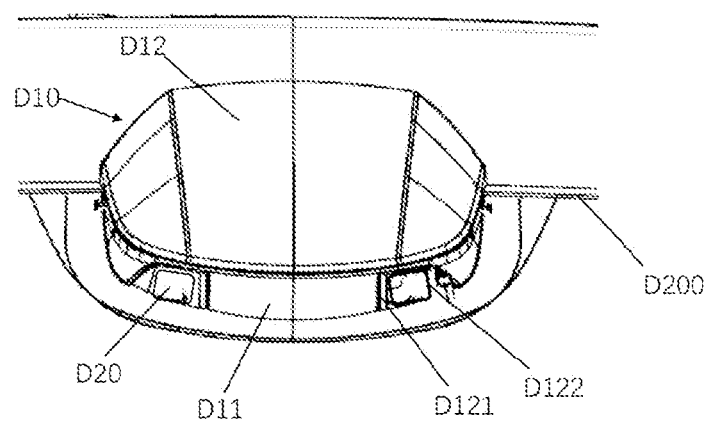
Figure 4B:
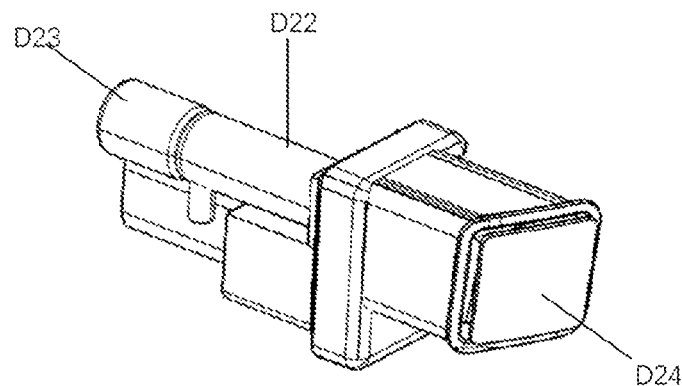
Figure 4C:
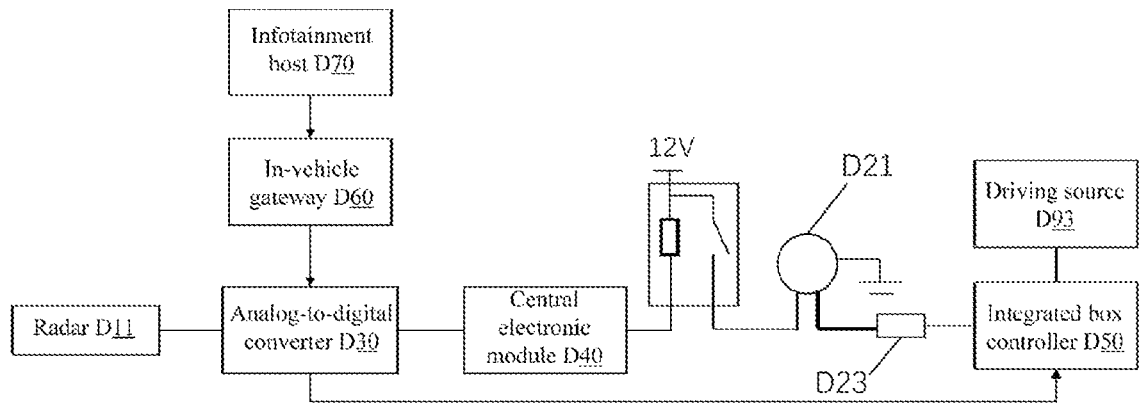
Figure 4D:
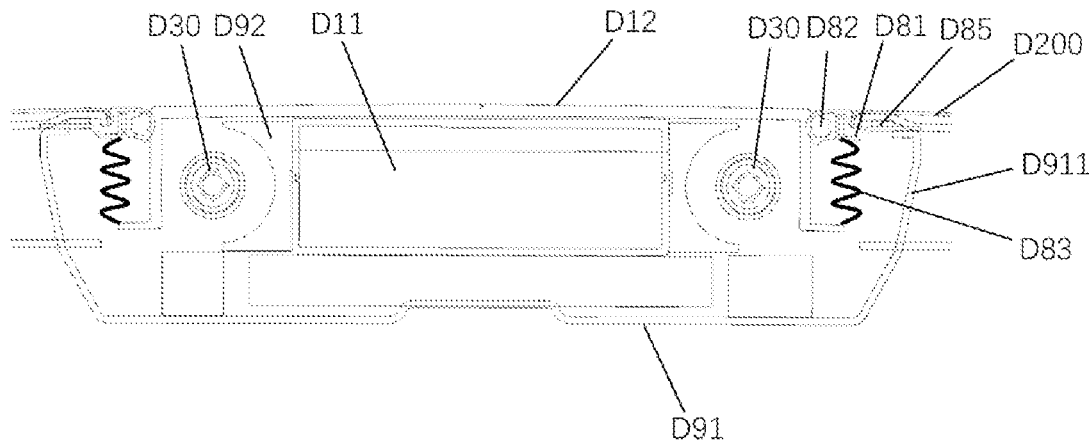
Figure 4E:
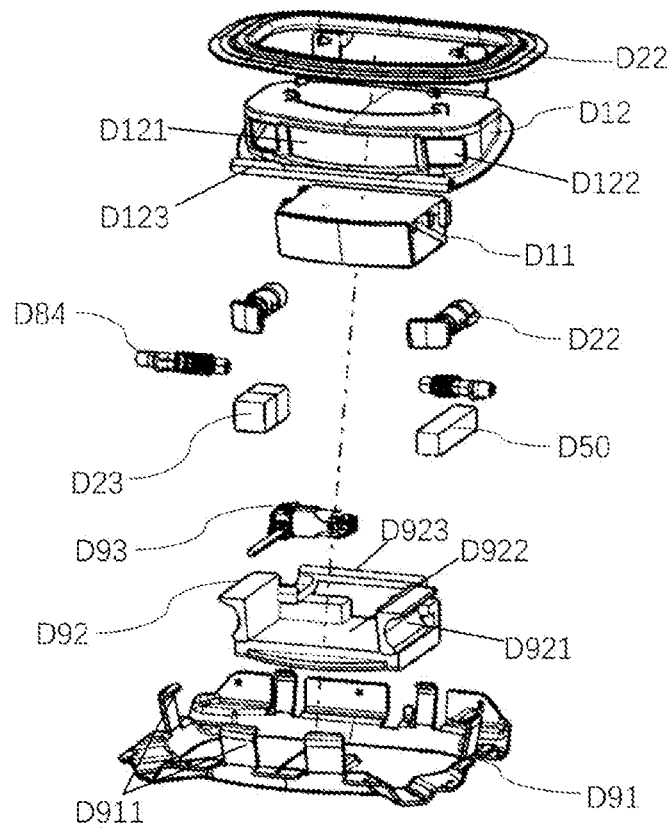

FIG. 4A is a schematic structural diagram of a vehicle-borne radar system according to an embodiment of the present invention when mounted on a vehicle;

FIG. 4B is a schematic structural diagram of a cleaning unit of the vehicle-borne radar system according to an embodiment of the present invention;

FIG. 4C is a connection block diagram of the vehicle-borne radar system according to an embodiment of the present invention;

FIG. 4D is a schematic sectional diagram of the vehicle-borne radar system according to an embodiment of the present invention when mounted on the vehicle; and FIG. 4E is a schematic exploded diagram of the vehicle-borne radar system according to an embodiment of the present invention.

Reference numerals in FIGS. 4A to 4E: D10—radar assembly, D11—radar, D12—radar box, D121—first opening, D122—second opening, D123—duct structure, D20—cleaning unit, D21—washing pump, D22—cleaning actuator, D23—electromagnetic valve, D24—cover plate, D30—analog-to-digital converter, D40—central electronic module, D50—integrated box controller, D60—in-vehicle gateway, D70—infotainment host, D81—mounting support, D82—second sealing strip, D83—sealing film, D84—water outlet, D85—double-sided adhesive tape, D91—fixed bottom plate, D911—connecting arm, D92—fixed base, D921—arc-shaped recess, D922—recess, D923—rotating shaft, D93—driving source, D200—vehicle body.

Figure 5A:
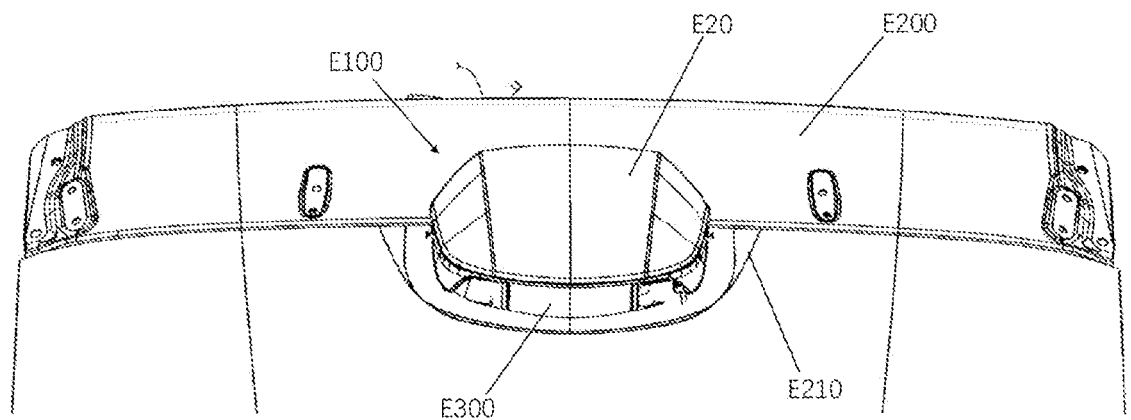
Figure 5B:
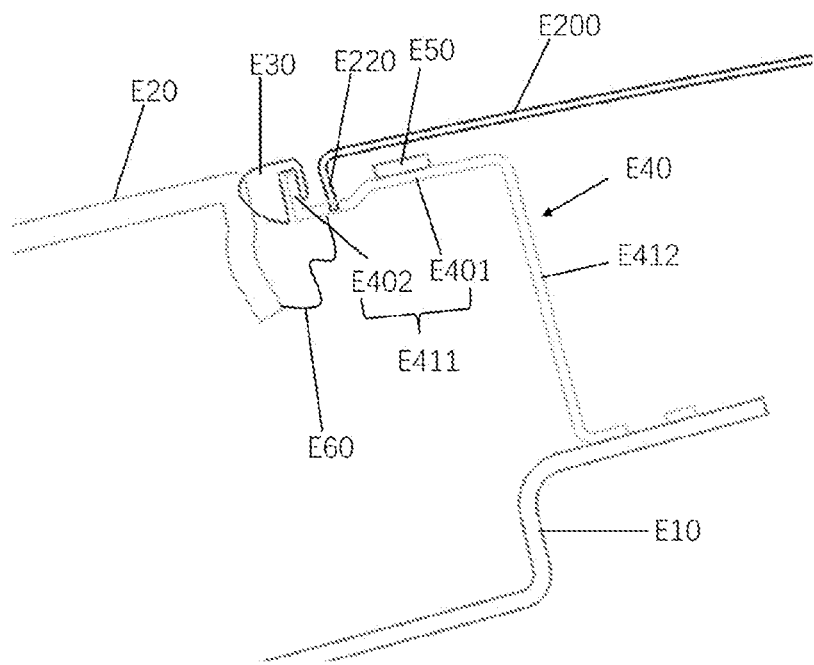
Figure 5C:
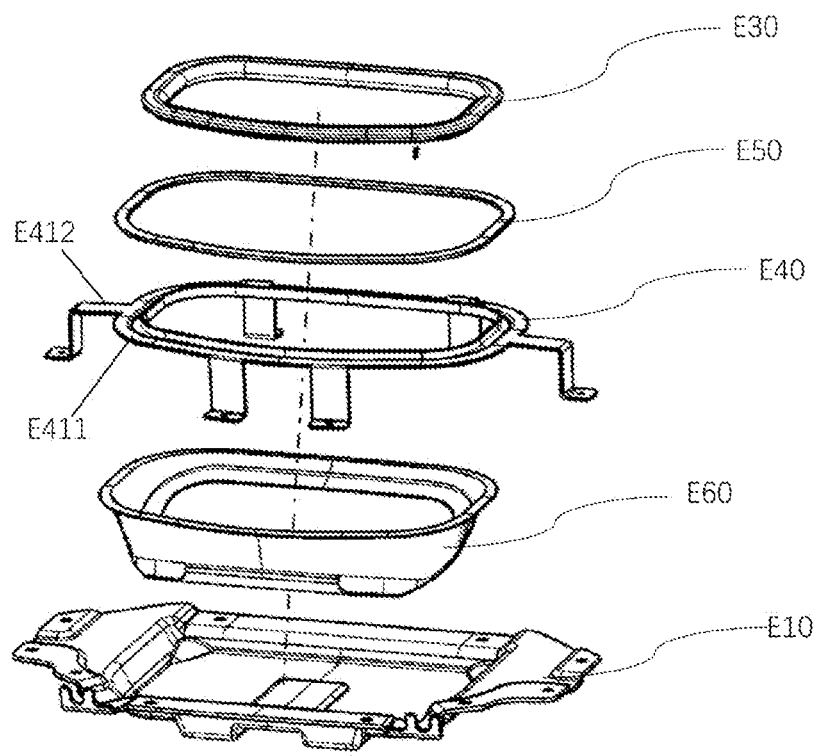
Figure 5D:
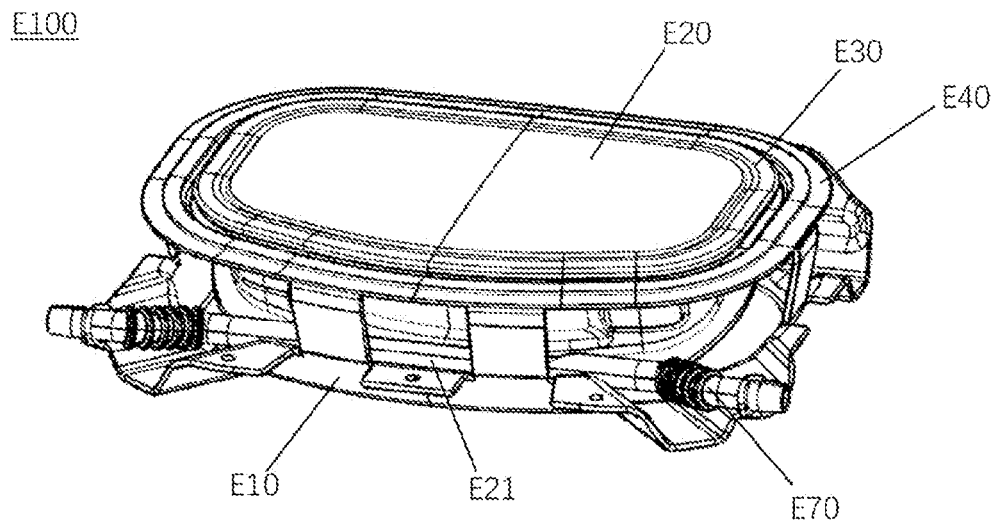

FIG. 5A is a schematic structural diagram of a turnover radar integrated box according to an embodiment of the present invention when mounted on a vehicle;

FIG. 5B is a partial sectional view of the turnover radar integrated box according to an embodiment of the present invention when mounted on the vehicle;

FIG. 5C is a schematic exploded diagram of the turnover radar integrated box according to an embodiment of the present invention; and FIG. 5D is a schematic structural diagram of the turnover radar integrated box according to an embodiment of the present invention.

Reference numerals in FIGS. 5A to 5D: E100—turnover radar integrated box, E10—tray, E20—protective shell, E21—water flowing pipe, E30—outer sealing strip, E40—outer sealing support, E411—main body, E412—connecting leg, E401—flat plate portion, E402—vertical clamping portion, E50—adhesive tape, E60—waterproof film, E70—hose, E200—target vehicle body, E210—preset opening, E220—bent portion, E300—radar.

Figure 6A:
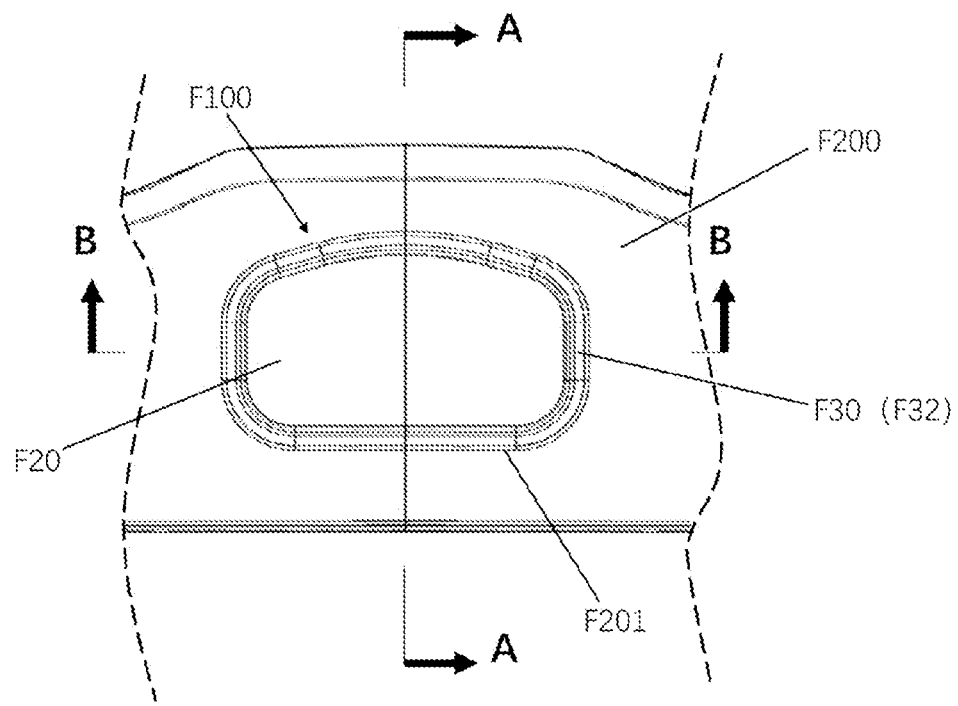
Figure 6B:
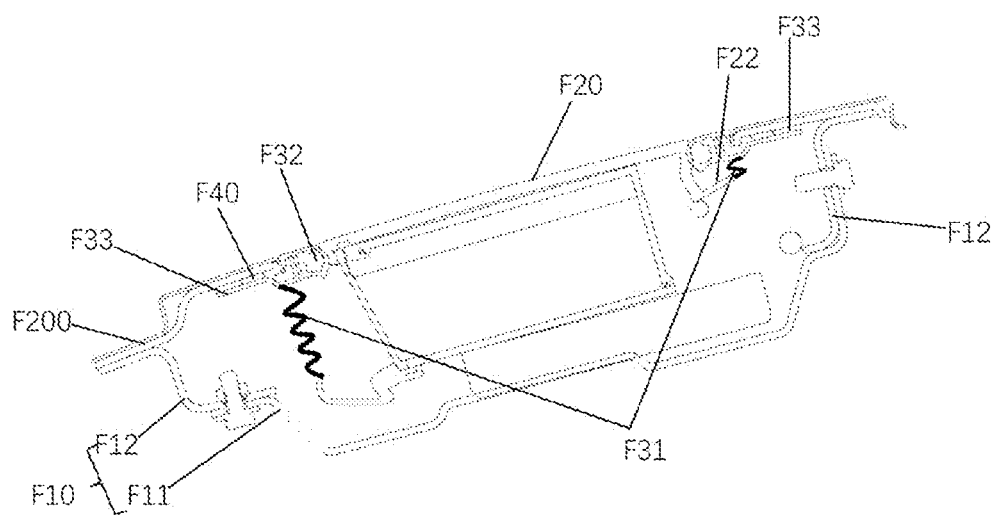
Figure 6C:
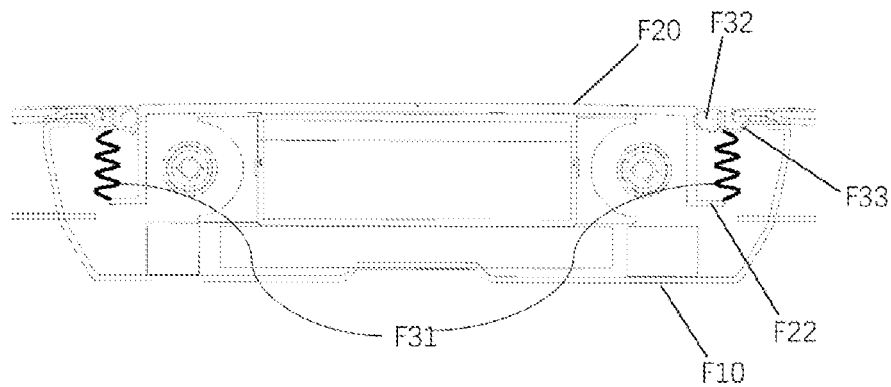
Figure 6D:
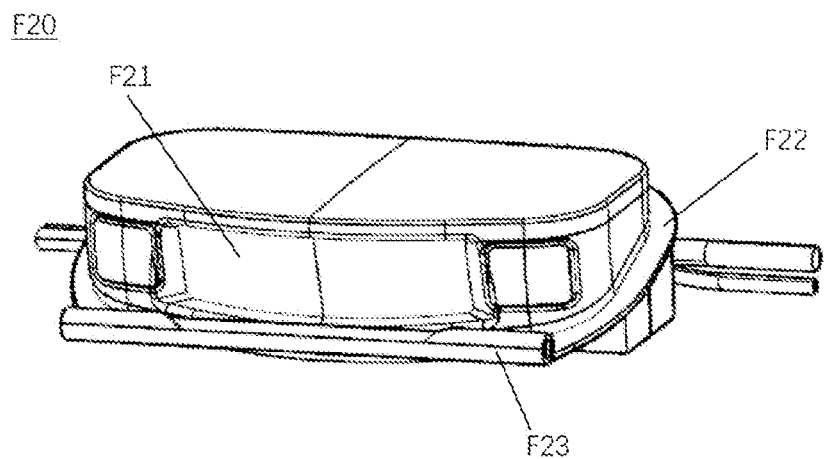
Figure 6E:
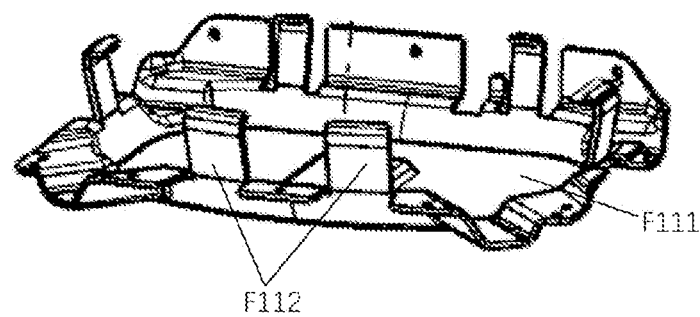

FIG. 6A is a top view of a hidden vehicle-borne radar mounting assembly according to an embodiment of the present invention when mounted on a vehicle;

FIG. 6B is a sectional view taken along section line A-A of FIG. 6A;

FIG. 6C is a sectional view taken along section line B-B of FIG. 6A;

FIG. 6D is a schematic structural diagram of a radar enclosure of the hidden vehicle-borne radar mounting assembly according to an embodiment of the present invention; and FIG. 6E is a schematic structural diagram of a fixed bottom plate of the hidden vehicle-borne radar mounting assembly according to an embodiment of the present invention.

Reference numerals in FIGS. 6A to 6E: F100—vehicle-borne radar mounting assembly, F10—fixed assembly, F11—fixed bottom plate, F12—connecting support, F111—flat plate portion, F112—connecting leg, F20—radar enclosure, F21—window, F22—annular flange, F23—drainage duct, F30—sealing assembly, F31—sealing film, F32—sealing strip, F33—sealing support, F40—double-sided adhesive tape, F200—vehicle body, F201—mounting opening.

Figure 7A:
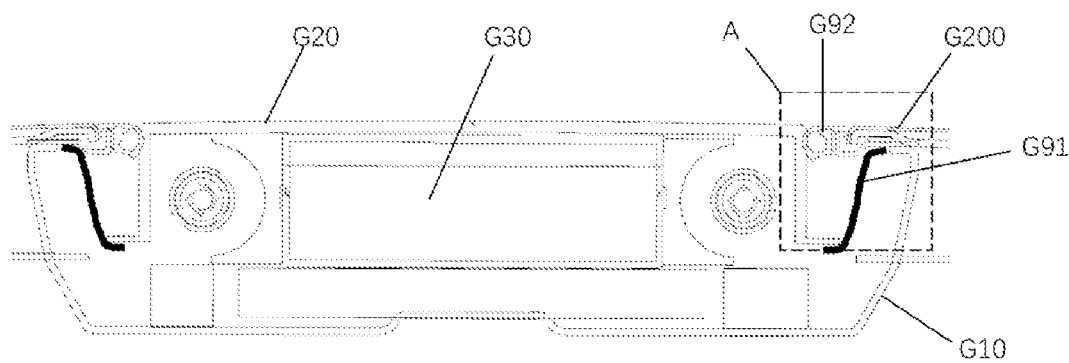
Figure 7B:
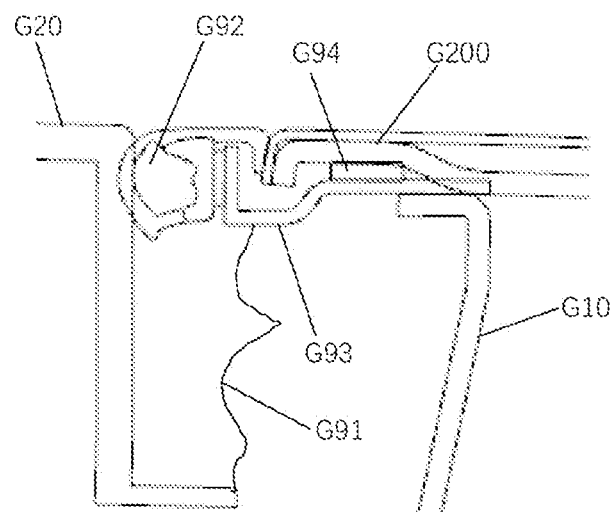
Figure 7C:
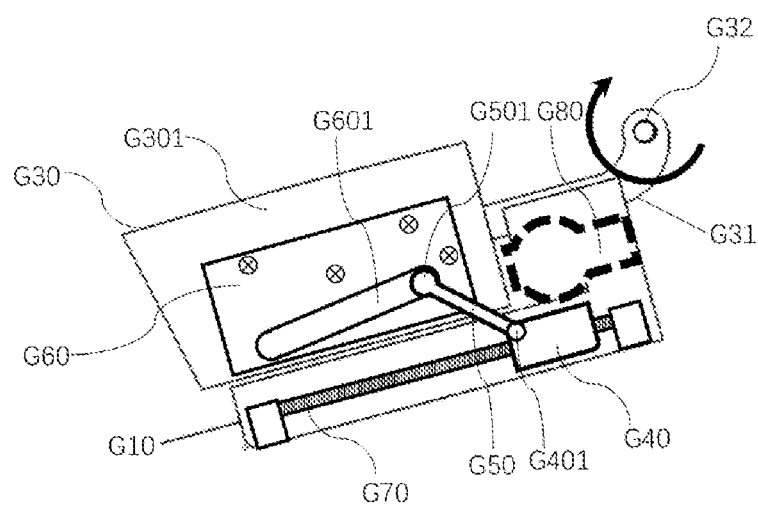
Figure 7D:
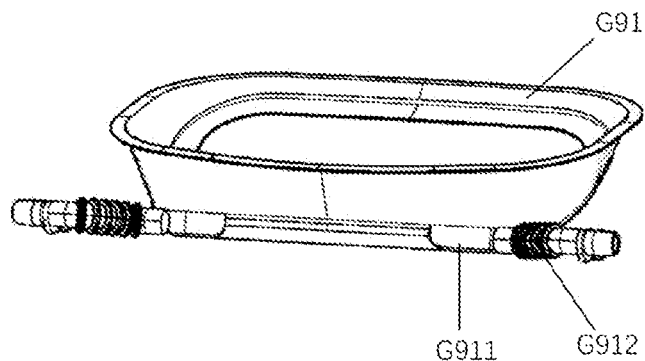

FIG. 7A is a schematic diagram of an assembled structure of a mounting device according to an embodiment of the present invention and a vehicle;

FIG. 7B is a partial enlarged view of area A in FIG. 7A;

FIG. 7C is a schematic structural diagram of a driving assembly of the mounting device according to an embodiment of the present invention; and FIG. 7D is a schematic structural diagram of an inner sealing film and a connecting pipe of the mounting device according to an embodiment of the present invention.

Reference numerals in FIGS. 7A to 7D: G10—fixed structure, G20—radar cover shell, G30—vehicle-borne radar, G31—connecting arm, G32—rotating shaft, G301—mounting side surface, G40—movable sliding block, G401—first hinge shaft, G50—connecting rod, G501—second hinge shaft, G60—cam plate, G601—moving sliding groove, G70—lead screw, G80—second power source, G91—inner sealing film, G911—water outlet, G912—connecting pipe, G92—outer sealing strip, G93—mounting support, G94—double-sided adhesive tape, G200—vehicle body.

Figure 8A:
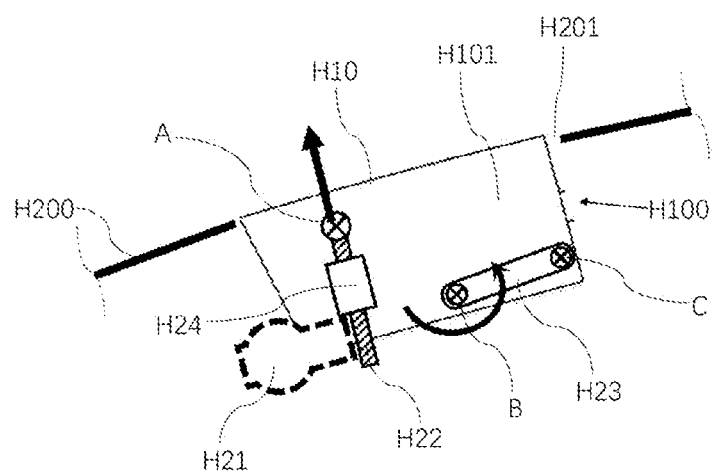
Figure 8B:
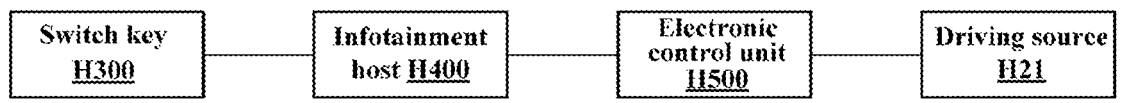

FIG. 8A is a schematic structural diagram of a turnover radar device according to an embodiment of the present invention; and FIG. 8B is a connection block diagram of a radar control system of a vehicle and the turnover radar device according to the embodiment of the present invention.

Reference numerals in FIGS. 8A to 8B: H100—turnover radar device, H10—radar box, H101—target side wall, H21—driving source, H22—lifting rod, H23—supporting arm, H24—lead screw sleeve, H200—vehicle body, H201—mounting opening, H300—switch key, H400—infotainment host, H500—electronic control unit.

Figure 9:
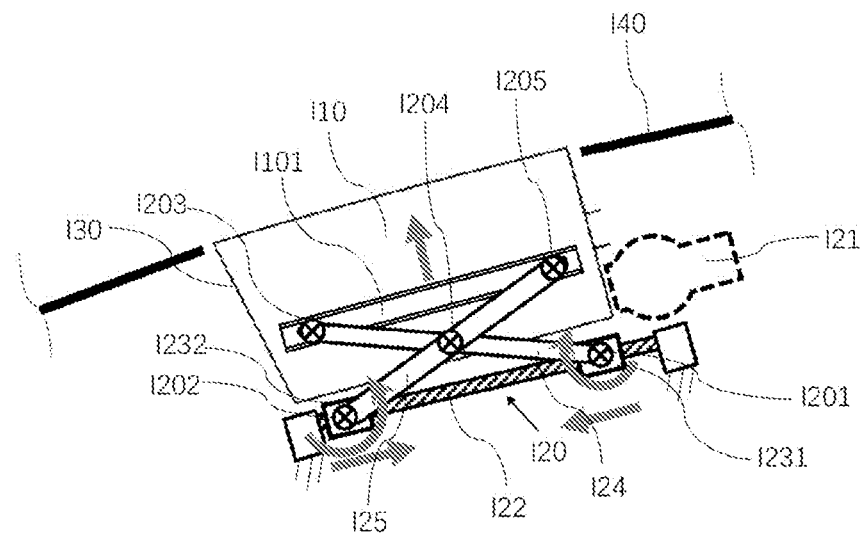

FIG. 9 is a schematic diagram of an assembly structure of a lifting vehicle-borne radar device according to an embodiment of the present invention and a target vehicle body.

Reference numerals in FIG. 9: I10—radar, I101—sliding groove, I20—lifting mechanism, I21—driving motor, I22—lead screw, I231—first sliding block, I232—second sliding block, I24—first connecting rod, I201—first rotating shaft, I25—second connecting rod, I202—second rotating shaft, I203—third rotating shaft, I204—fourth rotating shaft, I205—fifth rotating shaft, I30—sealing film, I40—target vehicle body.

Figure 10A:
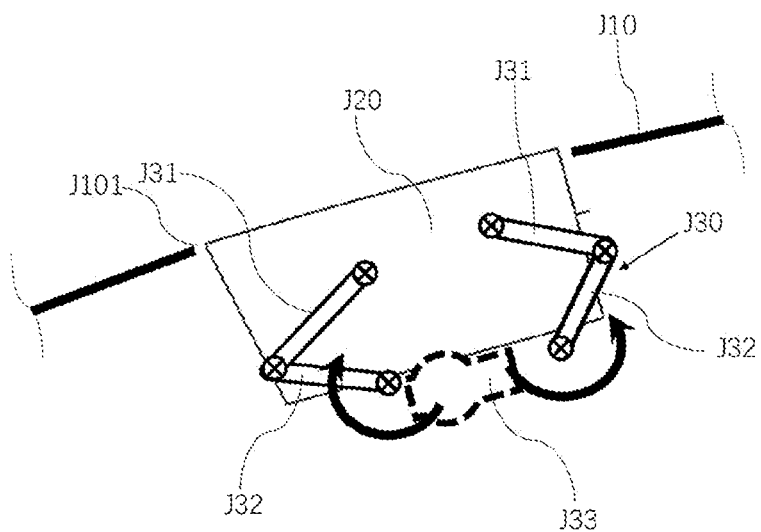
Figure 10B:
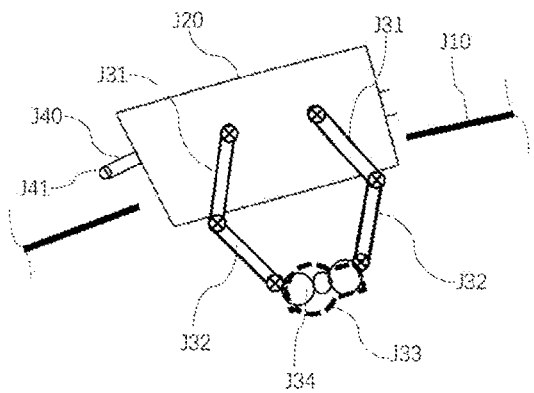
Figure 10C:
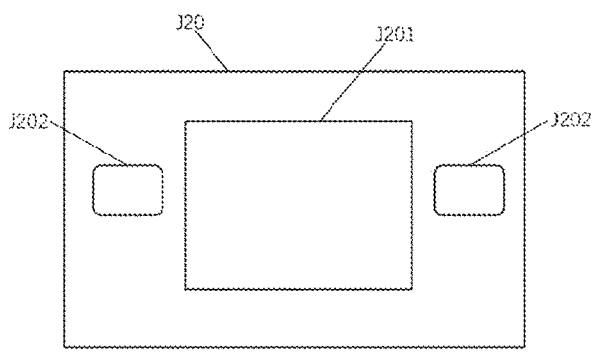

FIG. 10A is a schematic diagram of an assembly structure of a liftable radar device in a closed state according to an embodiment of the present invention and a vehicle body;

FIG. 10B is a schematic diagram of an assembly structure of the liftable radar device in a use state according to an embodiment of the present invention and the vehicle body; and FIG. 10C is a front view of a radar housing of the liftable radar device according to an embodiment of the present invention.

Reference numerals in FIGS. 10A to 10C: J10—vehicle body, J101—vehicle body opening, J20—radar housing, J201—visible window, J202—opening, J30—lifting mechanism, J31—first connecting rod, J32—second connecting rod, J33—driving source, J34—gear set, J40—cleaning mechanism, J41—nozzle.

Figure 11A:
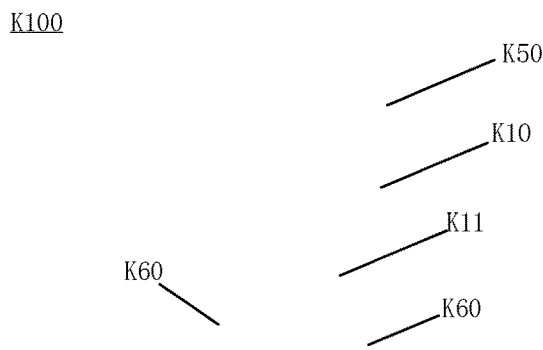
Figure 11B:
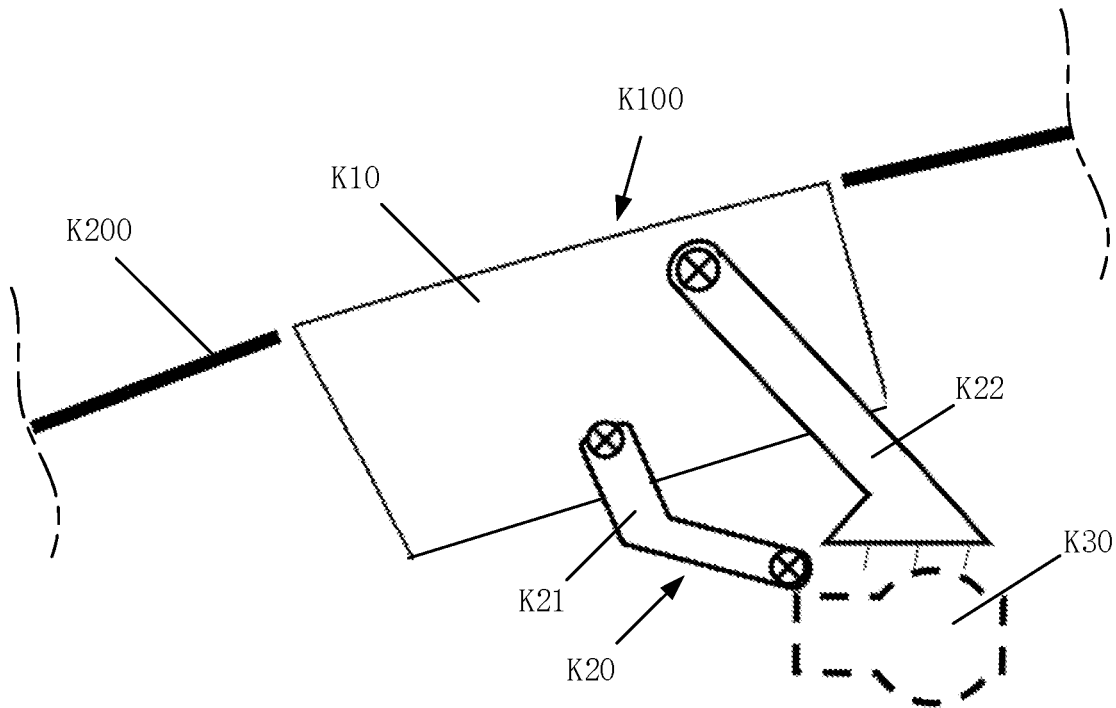
Figure 11C:
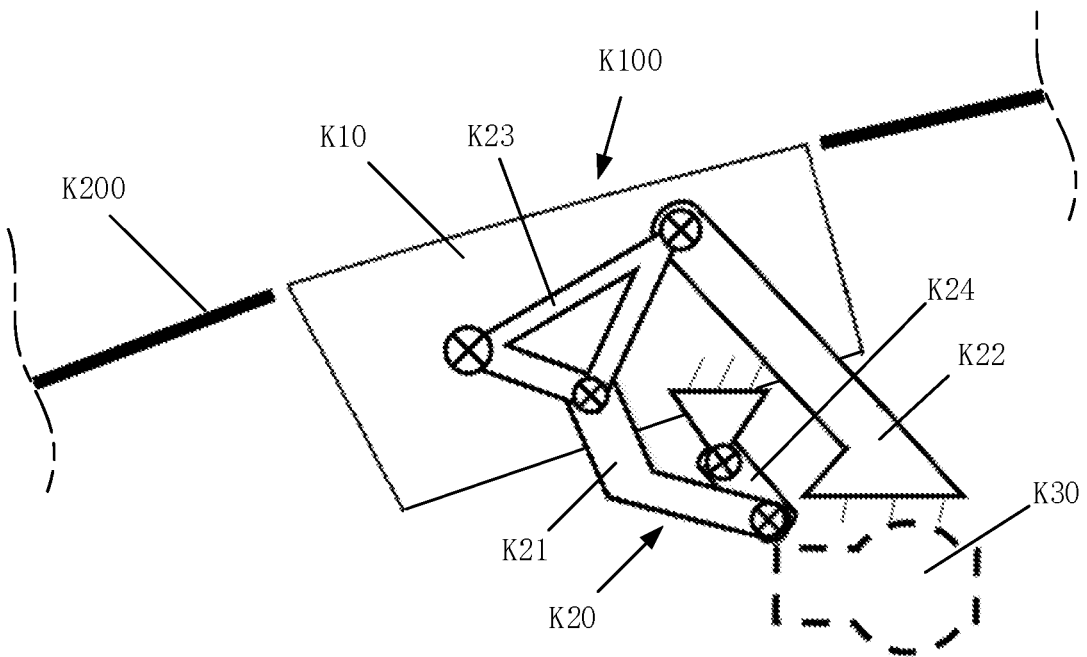
Figure 11D:
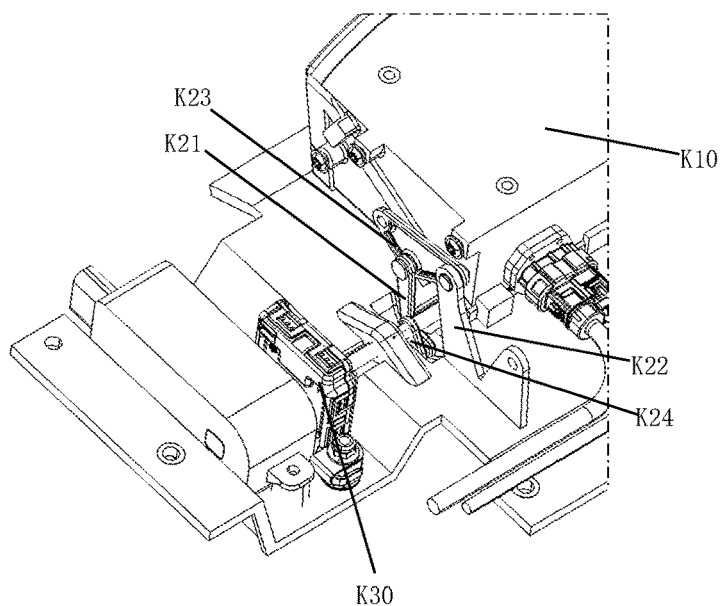

FIG. 11A is a schematic structural diagram of a radar system for a vehicle according to an embodiment of the present invention;

FIG. 11B is a schematic structural diagram of a turnover mechanism in the radar system for a vehicle according to an embodiment of the present invention;

FIG. 11C is a schematic structural diagram of a turnover mechanism in the radar system for a vehicle according to another embodiment of the present invention; and FIG. 11D is a schematic perspective diagram of the turnover mechanism in the radar system for a vehicle according to an embodiment of the present invention.

Reference numerals in FIGS. 11A to 11D: K100—radar system for vehicle, K200—vehicle body, K10—radar box, K20—turnover mechanism, K30—driving mechanism, K40—bottom plate, K50—sealing structure, K60—cleaning nozzle, K11—radar, K21—first turnover support, K22—fixed support, K23—second turnover support, K24—third turnover support.

Figure 12A:
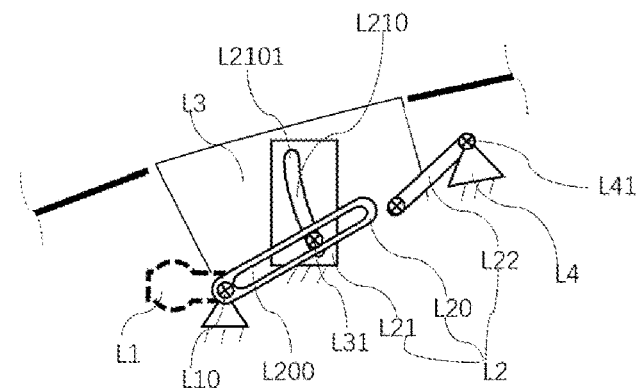
Figure 12B:
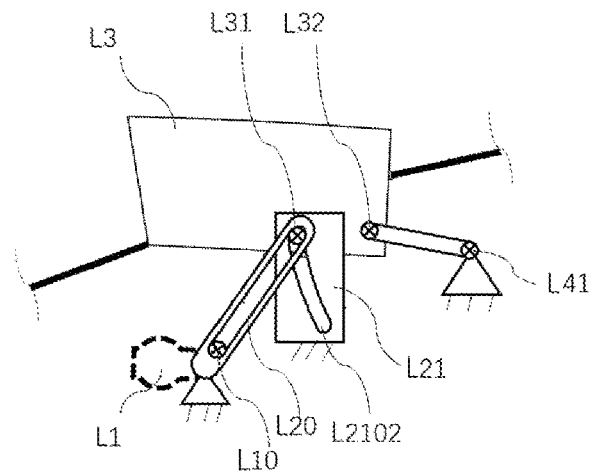

FIG. 12A is a schematic diagram of a lifting device for a hidden roof laser radar according to an embodiment of the present invention; and FIG. 12B is a schematic diagram of a position of the opened lifting device for a hidden roof laser radar according to an embodiment of the present invention.

Reference numerals in FIGS. 12A to 12B: L1—motor, L10—transmission shaft, L2—moving device, L20—driving rod, L200—strip-shaped hole, L21—restraint plate, L210—restraint strip hole, L2101—opening limiting end, L2102—closing limiting end, L22—rotating member, L3—radar device, L31—first anchoring shaft, L32—second anchoring shaft, L4—radar integrated box bottom plate, L41—rotating shaft.

DETAILED DESCRIPTION

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided such that this disclosure will be thoroughly understood, and will fully convey the scope of the disclosure to those skilled in the art.

It may be understood that in some of the embodiments described below, there may be certain structures or features which satisfy the following conditions: the names and/or numbers of a structure may vary in different embodiments, but may actually represent the same structural feature, which should be understood in conjunction with the corresponding drawings and the description of the corresponding embodiment.

It may be understood that in some of the embodiments described below, there may be certain structures or features which satisfy the following conditions: structures or features having the same name and/or number in different embodiments may or may not be identical in meaning, which should be understood in conjunction with the corresponding drawings and the description of the corresponding embodiment.

Figure 1B:
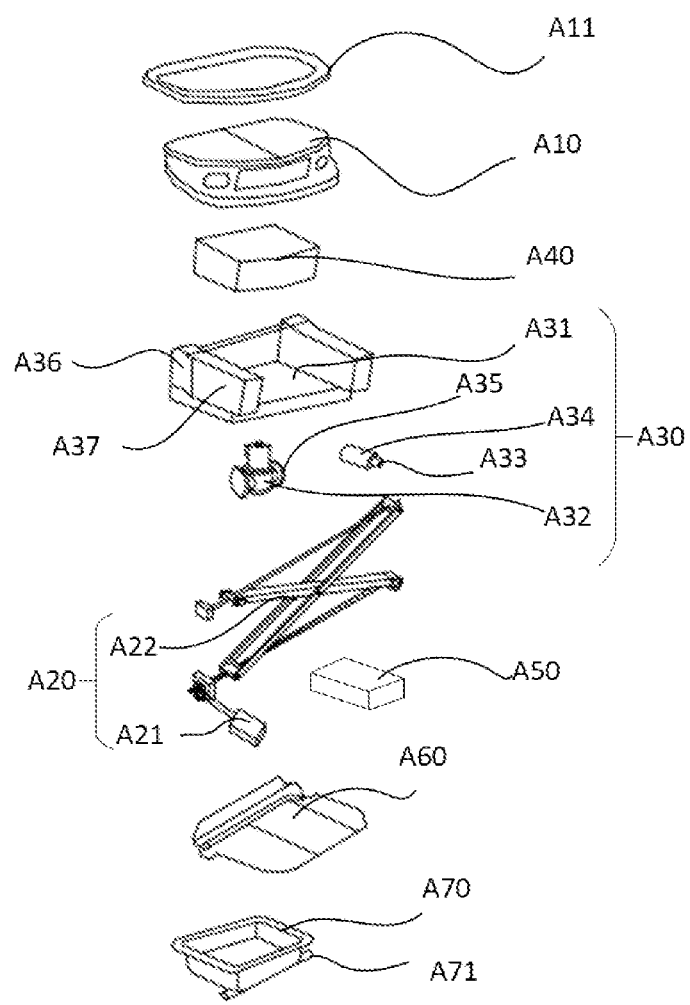
FIG. 1B is an exploded view of the laser radar integrated box according to the present invention.

Referring to FIG. 1B, in an embodiment, there is provided a laser radar integrated box, which at least includes an outer housing A10, a lifting device A20, a cleaning device A30, a laser radar A40, a controller A50, a lower cover plate A60, and a water pan A70; the laser radar A40, the lifting device A20, the cleaning device A30, and the controller A50 are all located between the outer housing A10 and the lower cover plate A60, the laser radar A40 is located above the lifting device A20, the lifting device A20 can extend or retract under control of the controller A50 to drive the laser radar A40 to extend to the outside of an automobile or retract to the inside of the automobile, the cleaning device A30 is located on two sides of the laser radar A40, the lower cover plate A60 is located in the water pan A70, and the controller A50 is connected with an automatic driving domain controller or an advanced assistant driving domain controller through a first wiring harness.

Figure 1C:
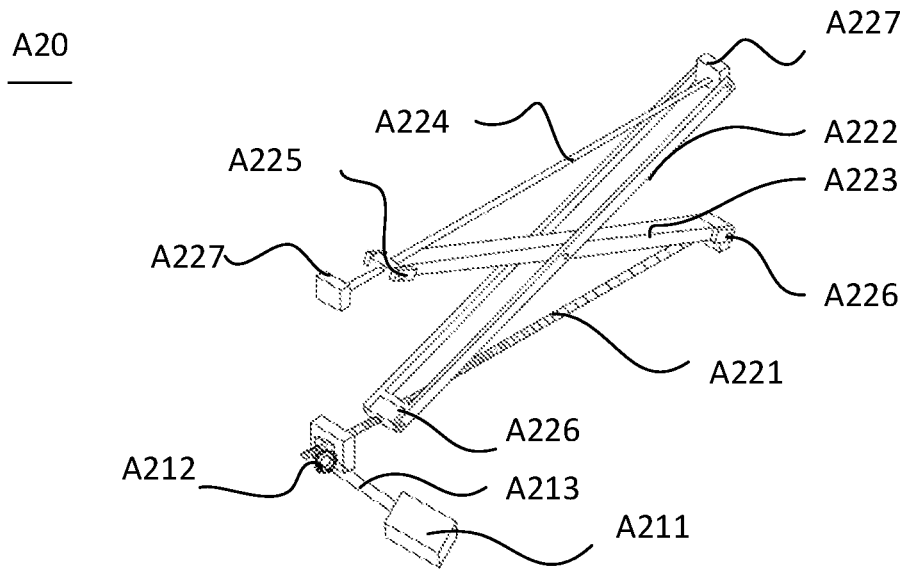
FIG. 1C is a schematic structural diagram of a lifting device in the present invention.

In an embodiment, referring to FIG. 1C together, the lifting device A20 at least includes a driving device A21 and a lifting platform A22 connected with the driving device A21, the driving device A21 includes a motor A211, a gear A212 and a rotating shaft A213, and the lifting platform A22 includes a lead screw A221, a first lifting rod A222, a second lifting rod A223, a supporting rod A224, an upper guide block A225, lower guide blocks A226 and a support 227.

Further, one end of the rotating shaft A213 is connected with an output shaft of the motor A211, the other end of the rotating shaft A213 is provided with teeth, the gear A212 is provided at one end of the lead screw A221, the teeth at the other end of the rotating shaft A213 are meshed with the gear A212 on the lead screw A221, and the lead screw A221 is driven to rotate by the motor A211.

In an embodiment, the first lifting rod A222 and the second lifting rod A223 are crossed and pivotally connected, an upper end of the first lifting rod A222 is pivotally connected with the support 227, an upper end of the second lifting rod A223 is pivotally connected with the upper guide block A225, lower ends of the first lifting rod A222 and the second lifting rod A223 are pivotally connected with the lower guide blocks A226, the upper guide block A225 is provided with a hole, one end of the supporting rod A224 passes through the hole of the upper guide block A225 and is slidably connected with the upper guide block A225, the lower guide blocks A226 are also provided with holes, two ends of the lead screw A221 pass through the holes of the lower guide blocks A226, and an end of the lead screw A221 close to the motor A211 is in threaded connection with the corresponding lower guide block A226; when the motor A211 drives the lead screw A221 to rotate, the lower guide block A226 in threaded connection with the lead screw A221 and the lead screw A221 move relatively to drive a bottom end of the first lifting rod A222 to move along the lead screw A221, thereby realizing a change of a vertical height of the first lifting rod A222 and achieving a lifting function; the supports 227 are fixed to both ends of the supporting rod A224 and connected with the cleaning device A30 and the laser radar A40, and therefore, the lifting platform A22 can drive the cleaning device A30 and the laser radar A40 to ascend or descend.

It should be noted that the lifting device A20 is not limited to the lifting device A20 described in the present embodiment, and any device having a lifting function may replace the lifting device A20 described in the present embodiment, and a specific structure of the lifting device in the prior art is not repeated in the present invention.

It should be further noted that the device for extending the laser radar A40 out of or hiding the laser radar A40 into a roof in the present invention is not limited to the lifting device A20 described in the present embodiment, and may be a turnover or rotating device with one side of a roof opening as a rotating or turnover shaft, the turnover or rotating device and the laser radar A40 are fixed, and in a rotating process, the laser radar A40 is rotated out of or into the roof, and a specific structure of the turnover or rotating device in the prior art is not repeated in the present invention.

Figure 1D:
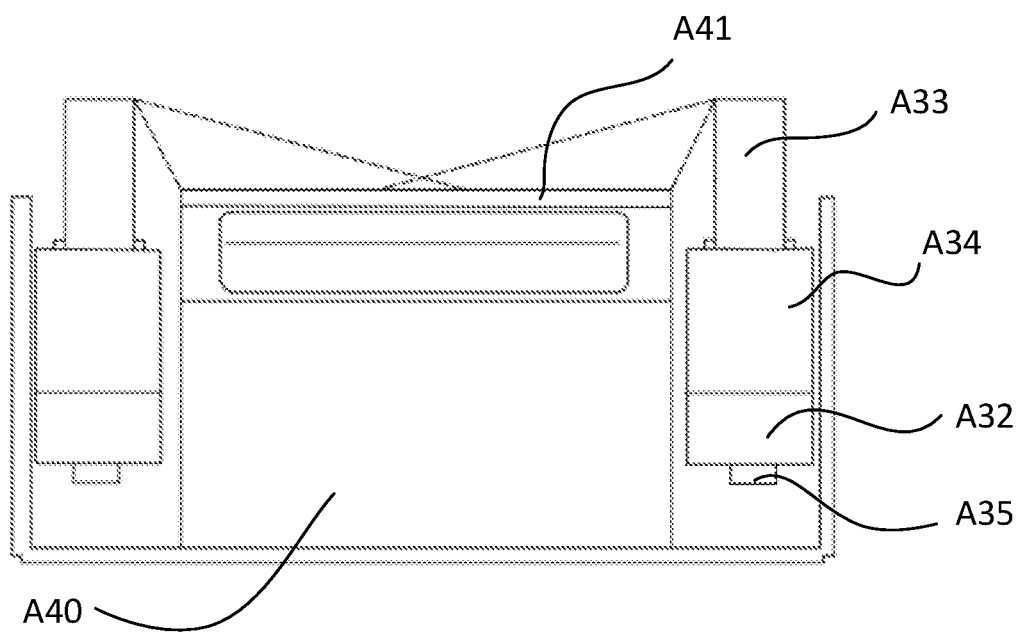
FIG. 1D is a sectional view of a cleaning device and a laser radar in the present invention.

In an embodiment, referring to FIG. 1D, the cleaning device A30 at least includes a fixed frame A31, an electromagnetic valve A32, a nozzle A33, a connecting portion A34, and a water inlet A35; the laser radar 20 is provided on the fixed frame A31, and each of two sides of the fixed frame A31 is provided with a combined structure 311 of the electromagnetic valve A32, the nozzle A33, the connecting portion A34, and the water inlet A35. Specifically, one end of the electromagnetic valve A32 is connected with the connecting portion A34, and the other end of the electromagnetic valve A32 is connected with the water inlet A35, so as to control opening and closing of the water inlet A35; a pipeline connected with the water inlet A35 is connected with a water path of a finished automobile. The nozzle A33 is connected with the connecting portion A34, and the nozzle A33 has an extendable and retractable function, retracts into the connecting portion A34 when not used, and extends out of the connecting portion A34 under an action of a water pressure when used.

It should be noted that the nozzle A33 may be of a telescopic structure that the nozzle is telescopic relative to the connecting portion A34, or of a fixed structure that the nozzle is directly fixed to the connecting portion A34, and in the present embodiment, the nozzle A33 is telescopic.

Referring to FIG. 1D, a mirror surface A41 is fixed on a working side of the laser radar A40, the other side of the laser radar is connected with a second wiring harness, and the second wiring harness is connected with the automatic driving domain controller or the advanced assistant driving domain controller; when the laser radar A40 detects that the mirror surface A41 is affected by dirt, the second wiring harness can transmit a signal to the automatic driving domain controller or the advanced assistant driving domain controller, the automatic driving domain controller or the advanced assistant driving domain controller sends a cleaning signal to the electromagnetic valve A32, the electromagnetic valve A32 is opened, and the nozzle A33 extends out and sprays water to the mirror surface A41 for cleaning; in the drawing, the nozzle A33 is in an extending-out state, and the dotted line represents a water spraying range; that is, the water sprayed by the nozzles A33 on the two sides can cover the whole mirror surface A41.

It should be noted that referring to FIG. 1B, the outer housing A10 is provided with a plurality of windows, including a mirror surface window, a nozzle window, a window for the second wiring harness of the laser radar, a window for the first wiring harness of the controller, a window for a water pipe of the water inlet, or the like, which are not shown one by one in FIG. 1B.

In an embodiment, a water outlet A71 is further formed in the water pan A70, a water pipe connected to the water outlet A71 is connected with the water path of the finished automobile, and after the cleaning device A30 finishes cleaning, sewage is accumulated in the water pan A70 and discharged to a drain channel of the finished automobile through the water outlet A71. The water pan A70 is fixed inside a roof A80 (see FIG. 1A).

In an embodiment, referring to FIG. 1B, a waterproof sealing strip A11 is further provided around a top of the outer housing A10, and when the outer housing A10 does not rise, an upper surface of the outer housing A10 is flush with an opening on the roof A80, and the sealing strip A11 is attached to a periphery of the opening, so as to prevent rainwater from entering the laser radar integrated box and protect the laser radar A40.

It should be noted that referring to FIG. 1A, the laser radar integrated box according to the present invention may be mounted on a front side or a rear side of the roof A80, and the number of the laser radar integrated boxes may be increased or decreased as required, so as to sense environments in front of and behind the vehicle at the same time.

The laser radar integrated box according to the present embodiment has the following working principle: when a user has a driving demand, the automatic driving domain controller or the advanced assistant driving domain controller sends an opening signal of the laser radar integrated box, the controller A50 in the integrated box drives the motor A211 to rotate forwards, the lifting device A20 starts to work, the motor A211 drives the lead screw A221 to rotate through the gear A212, the first lifting rod A222 and the second lifting rod A223 drive the laser radar A40 and the cleaning device A30 to ascend, and when rising to an outer side of the roof A80, the laser radar A40 starts to work; when detecting that the mirror surface A41 is affected by dirt, the laser radar A40 sends a dirt signal to the automatic driving domain controller or the advanced assistant driving domain controller, the automatic driving domain controller or the advanced assistant driving domain controller sends a cleaning signal to the controller A50 inside the integrated box, the automatic driving domain controller or the advanced assistant driving domain controller drives the cleaning water pump to pressurize a water path, and after a period of time, the controller A50 inside the integrated box drives the cleaning device A30 to start to work, the electromagnetic valve A32 is opened, the nozzle A33 sprays water to clean the mirror surface A41 of the laser radar A40, and after cleaning is finished, the electromagnetic valve A32 is closed, and the water outlet A71 discharges the sewage accumulated in the water pan A70; when the driving function is quit, the automatic driving domain controller or the advanced assistant driving domain controller sends a closing signal of the laser radar integrated box, the controller A50 in the integrated box drives the motor A211 to rotate reversely, and the laser radar integrated box descends and is closed.

As can be seen from the above description, the laser radar integrated box according to the present embodiment has the following advantages: the laser radar integrated box is designed at the roof which is high, and is not easy to be shielded and damaged by collision, a field of vision is wide, and a visual field angle of the laser radar can be expanded to a maximum extent, thus improving an environment perception effect; meanwhile, heat dissipation of the radar during working is realized through natural wind cooling; a hiding function is achieved, and when the laser radar is in a standby state, the laser radar, the lifting device and the cleaning device are all hidden inside the roof, an overall sense and attractiveness of the vehicle are enhanced, and the mirror surface of the laser radar is not prone to contact dirt, such as soil; the active cleaning function of the laser radar is achieved, thereby improving user experience.

The present invention further provides a vehicle which includes the laser radar integrated box according to any one or more (including two) of the above embodiments, and other technical features of the vehicle are not repeated herein.

In another embodiment, the present invention further provides a radar integrated box, FIG. 2A is a schematic mounting diagram of a radar integrated box B100 according to an embodiment of the present invention and a vehicle body, and FIG. 2B is a schematic exploded diagram of the radar integrated box B100 shown in FIG. 2A. As shown in FIGS. 2A and 2B, in a specific embodiment, the radar integrated box B100 integrated on a vehicle includes a housing B10, a radar B20, a sensor and at least one light source B14, the housing B10 is mounted on a vehicle body B200, an accommodating space is defined inside the housing B10, and the radar B20 is mounted in the accommodating space. The sensor is provided in the housing B10 and configured to sense a moving target within a preset range around the vehicle. The light source B14 is provided on the housing B10, connected with the sensor (not shown) and configured to be controllably turned on when the sensor senses the moving target. Here, the radar B20 is a laser radar fixed to a bottom plate B11 by fastening bolts.

In the present embodiment, the light source B14 is additionally provided on the radar integrated box B100 and can be automatically turned on when a user is sensed to be near the vehicle, thereby achieving a welcoming function of the radar integrated box B100, and improving interestingness of the radar integrated box B100.

In an embodiment, the housing B10 includes the bottom plate B11, a side enclosing plate B12 and an upper cover plate B13, the bottom plate B11 is connected with the vehicle, and the radar B20 is connected with the bottom plate B11. The side enclosing plate B12 is arranged along a vertical direction of the vehicle, a bottom of the side enclosing plate B12 is connected with the bottom plate B11, and an opening B121 is formed in the side enclosing plate B12 to expose the radar B20. The upper cover plate B13 is located on a side of the side enclosing plate B12 facing a roof and connected with a top of the side enclosing plate B12. That is, the bottom plate B11, the side enclosing plate B12 and the upper cover plate B13 form the housing B10, and the accommodating space is defined among the bottom plate B11, the side enclosing plate B12 and the upper cover plate B13. Specifically, the side enclosing plate B12 is provided with the opening B121, so as to achieve a detection function of the radar B20, and a direction of the opening B121 can be specifically set according to a specific detection region of the radar B20.

In an embodiment, the upper cover plate B13 includes a top plate B131 and two inclined plates B132, the two inclined plates B132 are obliquely provided on two sides of the top plate B131 respectively and connected with the top plate B131, and the two inclined plates B132 are further connected with the side enclosing plate B12. Here, the upper cover plate B13 equivalently has an arch shape, and compared to a flat straight plate, the accommodating space can be enlarged, and the radar B20 or other components can be conveniently mounted inside the housing B10.

In an embodiment, the number of the at least one light source B14 is plural, and the plurality of light sources B14 are provided on the two inclined plates B132 respectively. In other embodiments, the plurality of light sources B14 are provided on the side enclosing plate B12. In the present embodiment, the plurality of light sources B14 can be configured to have different light colors, such that when a user approaches the vehicle, a welcoming function of the radar integrated box B100 can be achieved by using dynamic moving multi-color light effects. Specific light effects can be set according to specific design requirements.

In an embodiment, the side enclosing plate B12 includes a cleaning cover plate B122 configured to be opened by being turned over under control. The radar integrated box B100 further includes a cleaning mechanism B40 provided in the housing B10 to controllably extend out of the housing B10 when the cleaning cover plate B122 is opened, so as to clean a mirror surface of the radar B20. In the present embodiment, by providing the cleaning cover plate B122, dust or rainwater can be prevented from entering the housing B10 when the cleaning mechanism B40 is required to be used.

In an embodiment, the cleaning mechanism B40 includes two cleaning nozzles provided on both sides of the radar B20 respectively, and a cleaning efficiency can be improved by using the two cleaning nozzles.

In an embodiment, the side enclosing plate B12 further includes a camera cover plate B123 configured to be opened by being turned over under control. The radar integrated box B100 further includes a camera B30 provided in the housing B10 to controllably extend out of the housing B10 when the camera cover plate B123 is opened, so as to photograph the mirror surface of the radar B20.

In an embodiment, the radar integrated box B100 further includes a control unit provided in the housing B10, connected with the at least one light source B14 and the sensor, and configured to control the at least one light source B14 to be turned on or off. Specifically, the control unit is also connected with the cleaning cover plate B122, the camera cover plate B123, the cleaning mechanism B40 and the camera B30.

When the vehicle is started, the control unit controls the camera cover plate B123 to be turned over and opened, and controls the camera B30 to extend out of the housing B10, such that the camera B30 can photograph the mirror surface of the radar B20, and transmits a shot picture to the control unit, and when determining that the mirror surface of the radar B20 is dirty, the control unit controls the cleaning cover plate B122 to be turned over and opened, and controls the cleaning mechanism B40 to extend out of the housing B10, such that the cleaning mechanism B40 can clean the mirror surface of the radar B20. Here, a cleaning time may be specifically set, for example, 30 s, or the like.

After the cleaning time, the control unit controls the cleaning mechanism B40 to retract into the housing B10 and controls the cleaning cover plate B122 to be turned over and closed, thereby achieving an automatic cleaning function of the radar integrated box B100. In other embodiments, the control unit may also control the light source B14 to be turned on according to a received voice signal transmitted by a vehicle voice system, and the voice signal may be sent by a user.

The present invention further provides a vehicle having the radar integrated box B100 according to any one of the above embodiments mounted thereon. The radar integrated box B100 is not repeated herein.

In the present invention, the light source B14 is mounted on the radar integrated box B100, and when the sensor senses that the user is in a preset range of the vehicle, the radar integrated box B100 can automatically turn on the light source B14, and the user is welcomed by the preset light effect, such that the function of the radar integrated box B100 is prevented from being single, the welcoming function of the radar integrated box B100 is achieved, and the interestingness of the radar integrated box B100 is improved.

In an embodiment, there is further provided a structure of a cleaning device for a radar. FIG. 3A is a schematic structural diagram of a cleaning device C100 for a radar according to an embodiment of the present invention, and FIG. 3B is a schematic exploded diagram of the cleaning device C100 shown in FIG. 3A. As shown in FIGS. 3A and 3B, in a specific embodiment, the cleaning device C100 for a radar includes a housing C10, a nozzle C20, an electromagnetic valve C30, and a water pump (not shown), a liquid channel C11 is provided in the housing C10, and one end of the liquid channel C11 is connected with a water supply device (not shown). The nozzle C20 is provided at an end of the liquid channel C11 apart from the water supply device, at least part of the nozzle C20 is located in the housing C10, and the nozzle C20 is configured to spray water to a mirror surface of the radar. The electromagnetic valve C30 is provided on the liquid channel C11 and configured to open or close the liquid channel C11 under control, so as to allow the cleaning device C100 to be in a water spraying state or an off state. The water pump is connected with the liquid channel C11 and configured to be started cooperatively when the electromagnetic valve C30 is opened, so as to drive liquid of the liquid channel C11 to flow and allow the liquid to be sprayed out of the nozzle C20.

In the present invention, when the radar is required to be cleaned, it only needs to simultaneously start the electromagnetic valve C30 and the water pump, automatic cleaning of the radar can be realized, and manual cleaning after parking is not required, thus guaranteeing continuity of automatic driving.

In an embodiment, the nozzle C20 is configured to be extendable and retractable so that it is located in the housing C10 when the cleaning device C100 is in the off state, and at least part of the nozzle C20 extends out of the housing C10 when the cleaning device C100 is in the water spraying state. In the present embodiment, the nozzle C20 is configured to be extendable and retractable, such that the nozzle C20 can extend out of the housing C10 when the radar is required to be cleaned, and the nozzle C20 can be located inside the housing C10 when the radar is not required to be cleaned, and dust or rainwater contamination can be avoided.

In an embodiment, a sliding block is provided on the nozzle C20, and a sliding groove fitted with the sliding block is formed in the housing C10, such that the sliding block slides along the sliding groove when a water pressure in the liquid channel C11 reaches a preset water pressure, thereby causing the nozzle C20 to extend out of the housing C10. The preset water pressure here can be set according to specific requirements. That is, a certain thrust of water flow is required to push the nozzle C20 to extend out of the housing C10; when the thrust of the water flow is less than a certain value, the nozzle C20 retracts into the housing C10 due to a reduction of the thrust. In other embodiments, a motor C50 may be provided to drive the nozzle C20 to extend out of the housing C10 or retract into the housing C10.

In an embodiment, a baffle C60 is provided on the housing C10, and the baffle C60 is configured to be controllably turned over and opened when the radar is required to be cleaned, such that the nozzle C20 can extend out of the housing C10. After cleaning of the radar is finished and the nozzle retracts into the housing C10, the baffle C60 is controlled to be turned over and closed, such that dust or rainwater is prevented from entering the housing C10.

In an embodiment, a plurality of water spraying holes are formed in a side of the nozzle C20 apart from the liquid channel C11, such that the liquid flowing out of the liquid channel C11 is sprayed out from the plurality of water spraying holes. The present embodiment is equivalent to splitting a water spraying hole with a larger cross sectional area into a plurality of water spraying holes with smaller cross sectional areas, which reduces the cross sectional area, thereby increasing a water spraying pressure and further improving a cleaning performance. In an embodiment, the nozzle C20 has a square cross section. The plurality of water spraying holes may be arranged on the nozzle C20 at intervals.

In an embodiment, the cleaning device C100 for a radar further includes a control unit C40 fixedly connected with the housing C10, connected with the electromagnetic valve C30 and configured to control the electromagnetic valve C30 to be opened or closed. Here, the control unit C40 is further connected with the water pump, and controls the water pump to be turned on while controlling the electromagnetic valve C30 to be opened.

In an embodiment, the cleaning device C100 for a radar further includes a detection unit connected with the control unit C40 and configured to detect whether an outer surface of the radar is dirty. Here, the detection unit may be a camera, and when capturing dirt on the mirror surface of the radar, the camera sends a signal to the control unit C40, and after receiving the signal, the control unit C40 controls the electromagnetic valve C30 and the water pump to be turned on simultaneously.

The control unit C40 is further connected with the baffle C60, and the control unit C40 controls the baffle C60 to be turned over and opened after receiving the signal, and controls the baffle C60 to be turned over and closed when the nozzle C20 retracts into the housing C10. In addition, the control unit C40 is also configured to control the baffle C60 to be turned over when receiving a voice signal sent by a vehicle voice system, and to control the electromagnetic valve C30 and the water pump to be turned on to clean the mirror surface of the radar by the nozzle C20. The voice signal here can be sent by a driver, and intelligence and humanization of the cleaning device C100 are further improved through the design.

In an embodiment, there is further provided a radar system for a vehicle having a radar and the above cleaning device C100 mounted thereon.

In an embodiment, two cleaning devices C100 are provided, and the two cleaning devices C100 are arranged on two sides of the radar respectively.

The present invention further provides a vehicle having the radar system according to any one of the above embodiments mounted thereon. The radar system is not repeated herein.

In the present invention, when the mirror surface of the radar is detected to be dirty, the cleaning device C100 can be automatically controlled to clean the radar at any time and any place, manual cleaning of the radar after parking is not required, the radar can be cleaned in an automatic driving process without interrupting automatic driving, and convenience and intelligence are realized.

In one or some embodiments of the present invention, the radar may be rotated or lifted relative to the vehicle body, and meanwhile provided with a dedicated cleaning unit. FIG. 4A is a schematic structural diagram of a vehicle-borne radar system according to an embodiment of the present invention when mounted on a vehicle. As shown in FIG. 4A, the vehicle-borne radar system according to the present embodiment includes a radar assembly D10, a driving mechanism (not shown) and a cleaning unit D20. The radar assembly D10 includes a radar D11 which may be a laser radar. The driving mechanism is connected with the radar assembly D10 and configured to controllably drive the radar assembly D10 to rotate or ascend/descend relative to a vehicle body, so as to expose an emission end of the radar D11 outside a vehicle (i.e., a state in FIG. 4A) or hide the radar assembly D10 in the vehicle. The driving mechanism here may be any mechanism capable of realizing lifting or turnover in the prior art, such as an electric lifting platform, a hydraulic turnover platform, or the like, which is not limited herein. The cleaning unit D20 is configured to controllably extend out when the emission end is exposed out of the vehicle and spray cleaning liquid to a mirror surface of the emission end. Here, operations of the driving mechanism and the cleaning unit D20 can be controlled by specially providing an integrated box controller D50 of the vehicle-borne radar system.

The vehicle-borne radar system according to the present embodiment can realize the turnover or lifting of the radar assembly D10 relative to the vehicle body, such that the radar D11 can be controlled to extend out of the vehicle for detection work, or hidden in the vehicle, and dust is not prone to be accumulated. In addition, the vehicle-borne radar system further includes the cleaning unit D20 which can clean the mirror surface of the radar D11, thus further guaranteeing cleanness of the radar D11, so as to guarantee accuracy of intelligent driving.

As shown in FIG. 4A, the radar assembly D10 further includes a radar box D12, a first opening D121 and a second opening D122 are formed in a side of the radar box D12 where the emission end of the radar D11 is, the first opening D121 is configured to expose the emission end, and the second opening D122 is configured to provide an extending/retracting passage for the cleaning unit D20.

FIG. 4B is a schematic structural diagram of the cleaning unit D20 of the vehicle-borne radar system according to an embodiment of the present invention. FIG. 4C is a connection block diagram of the vehicle-borne radar system according to an embodiment of the present invention. As shown in FIG. 4B, in the present embodiment, the cleaning unit D20 includes a washing kettle (not shown), a washing pump D21 (see FIG. 4C), an extendable and retractable cleaning actuator D22 and a cover plate D24. The washing kettle is configured to store cleaning liquid. The washing pump D21 is connected with the washing kettle through a first water pipe and configured to pump out the cleaning liquid in the washing kettle. The cleaning actuator D22 is provided in the radar box D12 and includes a nozzle connected with the washing pump D21 through a second water pipe, the nozzle is configured to spray the cleaning liquid to the mirror surface, and the second water pipe is provided with an electromagnetic valve D23 configured to control opening or closing of the second water pipe. The cover plate D24 is connected with the nozzle, matched with the second opening D122 and configured to close the second opening D122 when the cleaning actuator D22 retracts into the inside of the radar box D12. The cleaning actuator D22 here includes a telescopic mechanism connected with the nozzle, and the telescopic mechanism may be a mechanism which is automatically ejected by a water pressure after the electromagnetic valve D23 is opened, or may be an electric telescopic mechanism as long as the nozzle can be automatically extended and retracted.

The cleaning unit D20 in the present embodiment includes the cover plate D24 matched with the second opening D122; that is, the second opening D122 of the radar box D12 can be closed through the structure of the cleaning unit D20 without additionally providing an opening-closing door, such that a structure is simple and a cost is low.

In an embodiment, a first sealing strip is provided on a periphery of the cover plate D24 and configured to seal the cover plate D24 and the second opening D122. Due to the arrangement of the sealing strip, when the cleaning structure does not work, leakproofness of the radar box D12 can be guaranteed to prevent rainwater and dust from entering the radar box D12.

As shown in FIG. 4C, in an embodiment, the vehicle-borne radar system further includes an analog-to-digital converter D30, as well as a central electronic module D40 and an integrated box controller D50 connected with the analog-to-digital converter D30. The analog-to-digital converter D30 is also connected with the radar D11. The radar D11 in the present embodiment has a dirt detection function, the radar D11 is configured to send an analog signal to the analog-to-digital converter D30 when the mirror surface is detected to be dirty, the analog-to-digital converter D30 processes the analog signal into a digital signal and then sends the digital signal to the central electronic module D40 and the integrated box controller D50, the central electronic module D40 is configured to generate a first control signal according to the digital signal and send the first control signal to the washing pump D21, so as to control the washing pump D21 to work, and the integrated box controller D50 is configured to generate a second control signal according to the digital signal and send the second control signal to the electromagnetic valve D23, so as to control the electromagnetic valve D23 to be opened. Here, the analog-to-digital converter D30 transmits the signal to the central electronic module D40 through FlexRay, the central electronic module D40 compiles the signal and informs the washing pump D21 to work, and meanwhile, the analog-to-digital converter D30 translates a Lin signal and transmits the Lin signal to the integrated box controller D50 through a wiring harness, the integrated box controller D50 controls the electromagnetic valve D23 to open a water path, and the water pressure makes the nozzle extend.

In the present embodiment, automatic control of a working process of the cleaning unit D20 is realized through communication among the radar D11, the analog-to-digital converter D30, the central electronic module D40 and the integrated box controller D50. Certainly, this process is generally performed when the radar D11 is in an exposed working state during intelligent driving.

In an embodiment, as shown in FIG. 4C, the integrated box controller D50 is further connected with the driving mechanism, i.e., with a driving source D93 of the driving mechanism and configured to control an action of the driving mechanism, and the analog-to-digital converter D30 is further connected with an infotainment host D70 of the vehicle through an in-vehicle gateway D60, such that when the infotainment host D70 receives a signal for starting an intelligent driving function, the integrated box controller D50 controls the driving mechanism to drive the radar assembly D10 to act, so as to expose the emission end of the radar D11 outside the vehicle. The infotainment host D70 may enable the intelligent driving function by a touch operation of a touch screen or by voice interaction.

In the present embodiment, the infotainment host D70 of the vehicle is in communication connection with the vehicle-borne radar system, thus realizing automatic control of the movement of the radar assembly D10.

FIG. 4D is a schematic sectional diagram of the vehicle-borne radar system according to an embodiment of the present invention when mounted on the vehicle. As shown in FIG. 4D, in the present embodiment, the vehicle-borne radar system further includes a sealing structure including a mounting support D81 and a second sealing strip D82. The mounting support D81 is fixedly connected with the vehicle body, for example, bonded to the vehicle body D200 by double-sided adhesive tape D85. The second sealing strip D82 is connected with the mounting support D81 and located between the radar box D12 and a third opening of the vehicle body D200, and the radar box D12 has a shape matched with a shape of the third opening and moves out of the vehicle through the third opening. Certainly, the second sealing strip D82 is provided around the radar box D12, thereby achieving a complete sealing effect.

In the present embodiment, by providing the second sealing strip D82, a sealing function can be achieved when the radar assembly D10 does not work, so as to prevent rainwater outside the vehicle from entering the vehicle-borne radar system.

FIG. 4E is a schematic exploded diagram of the vehicle-borne radar system according to an embodiment of the present invention, and a sealing film D83 is not shown in FIG. 4E. As shown in FIG. 4D, in a further embodiment, the sealing structure further includes a soft sealing film D83 and a water outlet D84 (see FIG. 4E). The sealing film D83 is provided around the radar box D12, and both ends of the sealing film D83 are connected with a side wall of the radar box D12 and a lower side of the mounting support D81 respectively, such that when the radar assembly D10 moves to the working state relative to the vehicle body, the third opening is partially opened, and rainwater can be further prevented from entering the vehicle body by the sealing film D83. The water outlet D84 penetrates through the sealing film D83, and a side of the water outlet apart from the radar box D12 is communicated with a drain pipe of the vehicle. The water outlet D84 is provided to drain liquid falling into the sealing film D83 to keep the sealing film dry and clean. In an embodiment, a duct structure D123 connected with the water outlet D84 is formed on the radar box D12, and the duct structure D123 is provided with a communication port communicated with a space inside the sealing film D83.

As shown in FIG. 4D, in an embodiment, the vehicle-borne radar system further includes a fixed bottom plate and a fixed base D92. The fixed bottom plate D91 has a bottom fixedly connected with the vehicle body and an edge provided with a plurality of connecting arms D911 extending upwards (see also FIG. 4E), the connecting arms D911 being connected with a bottom of the mounting support D81. The fixed base D92 is provided at the fixed bottom plate D91 and configured to place the cleaning unit D20 and the driving source D93 of the driving mechanism, such as a motor.

As shown in FIG. 4E, in an embodiment, arc-shaped recesses D921 matched with the cleaning actuator D22 are formed on two sides of the fixed base D92, and configured to place the cleaning actuator D22, a recess D922 for placing the radar D11 is formed in a middle of the fixed base D92, and a rotating shaft D923 pivotally connected with the radar D11 is provided at a rear of the fixed base D92, such that the fixed base D92 in the present embodiment becomes a mounting base with comprehensive functions.

The present invention further provides a vehicle including the vehicle-borne radar system according to any one or combinations of the above embodiments.

The vehicle-borne radar system of the vehicle can realize the turnover or lifting of the radar assembly D10 relative to the vehicle body, such that the radar can be controlled to extend out of the vehicle for detection work, or hidden in the vehicle, and dust is not prone to be accumulated. In addition, the vehicle-borne radar system further includes the cleaning unit D20 which can clean the mirror surface of the radar, thus further guaranteeing cleanness of the radar, so as to guarantee accuracy of intelligent driving.

In order to enhance attractiveness of a radar mounting position of the vehicle, in an embodiment, the present invention further provides a protective shell for fixing the radar. FIG. 5A is a schematic structural diagram of a turnover radar integrated box E100 according to an embodiment of the present invention when mounted on a vehicle. FIG. 5B is a partial sectional view of the turnover radar integrated box E100 according to an embodiment of the present invention when mounted on the vehicle. The present invention provides a turnover radar integrated box E100 provided at a preset opening E210 (see FIG. 5A) of a target vehicle body E200, the target vehicle body E200 here can be a part of the vehicle on which a radar E300 is required to be mounted, such as a roof, a fender, or the like, and the radar E300 here can be a laser radar. As shown in FIG. 5B, in an embodiment, the turnover radar integrated box E100 includes a tray E10, a protective shell E20, a mounting fixed base (not shown) and a rotating mechanism (not shown). The tray E10 is connected with the target vehicle body E200 and located below the preset opening E210, and the tray E10 may be located right below the preset opening E210, and mounted to the vehicle body by fasteners for fixation. In an embodiment, when the target vehicle body E200 is the roof of the vehicle, the tray E10 is connected to a roof crossrail assembly of the vehicle by fasteners (for example, bolts). The protective shell E20 is matched with the preset opening E210; that is, a size of a circumference side of the protective shell E20 is matched with a size of the preset opening E210, such that the protective shell E20 can be in a state of being relatively closely fitted with the preset opening E210, i.e., a closed state of the turnover radar integrated box E100. A side of the protective shell E20 facing the inside of the vehicle is fixedly connected with the radar E300, and the protective shell E20 is located at a top of the radar E300 and can shield and protect the radar E300. The mounting fixed base is fixed to the tray E10 and pivotally connected with the protective shell E20 or the radar E300, and since the protective shell E20 and the radar E300 are fixed, only one of the protective shell E20 and the radar E300 needs to be pivotally connected with the mounting fixed base. The rotating mechanism is mounted at the mounting fixed base and configured to controllably drive the radar E300 and the protective shell E20 to rotate relative to the mounting fixed base, so as to expose the radar E300 outside the vehicle (i.e., an open state) or hide the radar E300 in the vehicle (i.e., a closed state). The rotating mechanism may be any one of driving mechanisms for realizing pivoting between two components in the prior art, for example, hydraulic jacking on one side, rotation of a rotating shaft between the protective shell E20 and the mounting fixed base by a motor, or the like, which is not limited herein. The rotating mechanism may be connected with a controller of the vehicle, or a controller independently provided in the radar integrated box 100, so as to be controlled to be turned on and off according to user instructions. Certainly, in other embodiments, the radar E300 and the protective shell E20 may be directly lifted out of the vehicle through the preset opening E210 by a lifting mechanism.

The present embodiment provides the turnover radar integrated box E100 including the protective shell E20 for fixing the radar E300, the protective shell E20 and the radar E300 can be both turned over relative to the fixed mounting fixed base, and the protective shell E20 is matched with the preset opening E210 of the vehicle body, such that a state of an integral appearance of the vehicle body can be formed in the closed state, so as to improve attractiveness and an aerodynamic performance of the vehicle; dust is not prone to be accumulated, and the radar E300 and the protective shell E20 can be controlled to be turned out to an outer side of the vehicle body in use, thereby facilitating adjustment of an angle of the radar E300.

As shown in FIG. 5B, in an embodiment, the turnover radar integrated box E100 further includes an outer sealing assembly, and the outer sealing assembly includes an outer sealing support E40 and an outer sealing strip E30. The outer sealing support E40 is hermetically connected with the target vehicle body E200 and configured to mount the outer sealing strip E30. The outer sealing strip E30 is located between the protective shell E20 and the target vehicle body E200 and configured to seal a gap between the protective shell E20 and the sealing support. As shown in FIG. 5B, the outer sealing strip E30 here may be located at a position approximately flush with the target vehicle body E200, which is equivalent to an arrangement of the outer sealing strip D30 around the preset opening E210. The arrangement of the outer sealing strip E30 can achieve a sealing effect when the radar integrated box E100 is in the closed state.

FIG. 5C is a schematic exploded diagram of the turnover radar integrated box E100 according to an embodiment of the present invention, and the protective shell E20 is not shown in FIG. 5C. Further, as shown in FIG. 5C, in an embodiment, the outer sealing support E40 includes an annular main body E411 and connecting legs E412 connected with the main body E411, the main body E411 is hermetically connected with the target vehicle body E200, and fixedly connected with the outer sealing strip E30, one end of the outer sealing strip E30 abuts against the protective shell E20, and a bottom end of each connecting leg E412 is connected with the tray E10. In an embodiment, as shown in FIG. 5B, the main body E411 includes a flat plate portion E401 provided parallel to the target vehicle body, and the flat plate portion E401 is bonded to the target vehicle body E200; for example, by annular adhesive tape E50, the outer sealing support E40 is bonded to an inner side of the target vehicle body E200.

As shown in FIG. 5B, in an embodiment, the main body E411 further includes a vertical clamping portion E402 configured to clamp the outer sealing strip E30, the vertical clamping portion E402 is connected to a side of the flat plate portion E401 close to the protective shell E20 and is perpendicular to the flat plate portion E401, a bent portion E220 pointing to the flat plate portion E401 is formed at the preset opening E210 of the target vehicle body E200, the flat plate portion E401 abuts against the bent portion E220, and a vertical portion is located between the bent portion E220 and the protective shell E20. Such a staggered structure formed by the bent portion E220 of the target vehicle body E200 and the vertical clamping portion E402 of the outer sealing support E40 can further achieve the sealing effect in cooperation with the above annular adhesive tape E50.

As shown in FIG. 5B, in an embodiment, the turnover radar integrated box E100 further includes a flexible waterproof film E60 provided between a bottom of the main body E411 and an outer side of the protective shell E20 and configured to form a sealed space between the main body E411 and the protective shell E20. Since the protective shell E20 is turnover, the waterproof film E60 connected thereto is configured to be flexible to better follow the protective shell E20. Further, because the protective shell E20 is turnover, the protective shell cannot be kept in a state of tightly abutting against the outer sealing strip E30 in real time, for example, in the open state, and by providing the waterproof film E60 between the protective shell E20 and the outer sealing support E40, water can be effectively prevented from flowing into the vehicle, thereby achieving a perfect sealing effect.

FIG. 5D is a schematic structural diagram of the turnover radar integrated box E100 according to an embodiment of the present invention, and the waterproof film E60 is not shown in FIG. 5D. As shown in FIG. 5D, in a further embodiment, the protective shell E20 is further provided with a water flowing pipe E21, and the water flowing pipe E21 is communicated with the sealed space; for example, a communication port is provided on a side of the water flowing pipe E21, and the water flowing pipe E21 is located at a lowest position of the sealed space. The water flowing pipe E21 is communicated with a drain pipe of the vehicle through a hose E70.

The arrangement of the water flowing pipe E21 and the hose E70 can ensure that water in the waterproof film E60 can be discharged through a drainage system of the vehicle, such that water is prevented from being accumulated in the waterproof film E60. The water flowing pipe E21 is fixedly provided on the protective shell E20 and can thus move with the protective shell E20, and the water flowing pipe E21 is communicated with the drain pipe of the vehicle by providing the hose E70, such that a moving condition of the water flowing pipe E21 can be adapted.

The present invention further provides a vehicle including the turnover radar integrated box E100 according to any one or combinations of the above embodiments.

The vehicle is provided with the turnover radar integrated box E100 including the protective shell E20 for fixing the radar, the protective shell E20 and the radar can be both turned over relative to the fixed mounting fixed base, and the protective shell E20 is matched with the preset opening E210 of the vehicle body, such that the state of the integral appearance of the vehicle body can be formed in the closed state, so as to improve the attractiveness and the aerodynamic performance of the vehicle; dust is not prone to be accumulated, and the radar and the protective shell E20 can be controlled to be turned out to the outer side of the vehicle body in use, thereby facilitating adjustment of the angle of the radar.

Since the radar can be turned over or lifted relative to the vehicle body, water leakage exists in a turnover or lifting state, and in view of this, in one or some embodiments of the present invention, a waterproof sealing structure of the radar is further designed. FIG. 6A is a top view of a hidden vehicle-borne radar mounting assembly F100 according to an embodiment of the present invention when mounted on a vehicle. FIG. 6B is a sectional view taken along section line A-A of FIG. 6A. FIG. 6C is a sectional view taken along section line B-B of FIG. 6A. FIG. 6D is a schematic structural diagram of a radar enclosure F20 of the hidden vehicle-borne radar mounting assembly F100 according to an embodiment of the present invention. As shown in FIG. 6A, the hidden vehicle-borne radar mounting assembly F100 according to the present invention is provided at a mounting opening F201 of a vehicle body F200, the vehicle body F200 here can be a position of a vehicle where a radar is required to be mounted, such as a roof, a front wall, a side wing, or the like, and the radar here can be a laser radar. As shown in FIG. 6B, the vehicle-borne radar mounting assembly F100 includes a fixed assembly F10, a radar enclosure F20 and a sealing assembly F30. The fixed assembly F10 is connected with the vehicle body F200 and configured as a recess. The radar enclosure F20 is provided in the recess and pivotally connected at the fixed assembly F10. Here, rotation of the radar enclosure F20 may be implemented by a driving source, such as a motor, a hydraulic assembly, or the like, and the driving source may be connected with a control unit of the vehicle to realize automatic control of turnover of the radar. The radar enclosure F20 is provided therein with an accommodating space for placing the radar; for example, a recess opening towards the inside of the vehicle is formed, and this recess is the aforementioned accommodating space. A window F21 (see FIG. 6D) for revealing the radar is provided at a side wall of the radar enclosure F20, such that a signal of an emission end of the radar can be directly emitted through the window F21. The radar enclosure F20 is configured to form a closed state (see FIG. 6B) where the radar enclosure F20 is hidden in the recess and an open state (not shown) where the window F21 of the radar enclosure F20 is completely exposed out of the recess during rotation relative to the fixed assembly F10. The sealing assembly F30 includes a flexible sealing film F31, the sealing film F31 is provided around the radar enclosure F20 and has one side hermetically connected with the target vehicle body F200 directly or indirectly and the other side hermetically connected with an outer side of the radar enclosure F20, so as to form a sealed water storage space between the target vehicle body and the radar enclosure F20, and the target vehicle body is a part of the vehicle body F200 on a peripheral side of the mounting opening F201. A lowest position of the sealing film F31 when the radar enclosure F20 is in the closed state is communicated with a drain pipe of the vehicle, so as to drain liquid in the water storage space. Since the sealing film F31 has one end fixed to the radar enclosure F20 and the radar enclosure F20 rotates relative to the fixed assembly F10, i.e., relative to the vehicle body F200, the sealing film F31 also rotates, and therefore, the lowest position of the sealing film F31 here is defined when the radar enclosure F20 is in the closed state, and liquid leaking into the water storage space can be prevented from being accumulated as long as the lowest position of the sealing film F31 in the closed state can be guaranteed to be connected with the drain pipe of the vehicle.

The present embodiment provides the hidden radar mounting assembly, the radar enclosure F20 with the radar can be turned out of the vehicle when the radar is required to be used, so as to expose the emission end from the window F21 of the radar enclosure F20, and the radar enclosure F20 is restored to the position inside the vehicle when the radar is not required to be used, thus guaranteeing attractiveness of an appearance of the vehicle.

In an embodiment, the radar mounting assembly is further provided with the sealing assembly F30 following the radar enclosure F20, such that the sealing assembly can adapt to the turnover radar enclosure F20, so as to achieve a real-time waterproof sealing effect. In addition, since the sealing film F31 of the sealing assembly F30 is communicated with the drain pipe of the vehicle, and the communicated position is the lowest position of the sealing film F31 when the radar enclosure F20 is in the closed state, accumulated water can be drained in the closed state, and the sealing film F31 is prevented from being soaked in water for a long time.

As shown in FIG. 6A, in an embodiment, the sealing assembly F30 further includes a sealing strip F32 provided around the radar enclosure F20 and between the target vehicle body and the radar enclosure F20. Due to the arrangement of the sealing strip F32, when the radar enclosure F20 is in the closed state, the gap between the radar enclosure F20 and the target vehicle body is sealed, a waterproof effect is achieved to prevent rainwater or other liquid from entering the assembly when the radar is not used.

As shown in FIG. 6B, in the present embodiment, the sealing assembly F30 further includes a sealing support F33 having one side connected with the target vehicle body and the other side configured to fix the sealing film F31. In an implementation, the sealing support F33 is bonded to a bottom of the target vehicle body by double-sided adhesive tape F40.

The sealing strip F32 can be mounted by providing the sealing support F33, a special mounting portion is not required to be machined on the vehicle body F200 to mount the sealing strip F32, and bonding by double-sided adhesive tape has a certain waterproof effect on the one hand and simplifies a mounting process on the other hand.

As shown in FIG. 6D, in an embodiment, an annular flange F22 extending out from an outer wall of the radar enclosure F20 is provided at the outer wall of the radar enclosure F20, and two ends of the sealing film F31 are connected with the sealing support F33 and the annular flange F22 respectively (see FIG. 6B or 6C).

In an embodiment, as shown in FIG. 6B, a height of a side of the outer wall of the radar enclosure F20 provided with the window F21 is larger than that of the opposite side, and the annular flange F22 is provided at a bottom of the outer wall of the radar enclosure F20. As shown in FIG. 6D, a bottom of the radar enclosure F20 is formed as a slope. With such arrangement, on the one hand, it is considered that one side of the radar enclosure F20 is a pivot connection side, the other side thereof is a turn-out side (i.e., the side provided with the window F21), and since the turn-out side has a large movement displacement, the sealing film F31 with a large displacement amount is required to follow the movement, and in addition, the pivot connection side is provided with the outer wall with a small height to save a space, and other components, such as a driving motor for driving the radar enclosure F20 to rotate, can be provided between a lower portion of the outer wall of the pivot connection side and the fixed assembly F10.

As shown in FIG. 6D, a drainage duct F23 communicated with the water storage space and the drain pipe is formed in the radar enclosure F20, and the sealing film F31 is provided with a channel through which the drainage duct F23 passes. Both ends of the drainage duct F23 may be communicated with two drain pipes through two flexible ducts, so as to adapt to a change in a position of the drainage duct F23 when the radar enclosure F20 rotates.

In another embodiment, as shown in FIG. 6E, the fixed assembly F10 includes a fixed bottom plate F11 and a plurality of connecting supports F12. Both ends of each connecting support F12 are connected with the target vehicle body and a periphery of the fixed bottom plate F11 respectively. The connecting supports F12 and the target vehicle body can be connected by welding, bonding or fasteners, and the connecting supports F12 and the fixed bottom plate F11 are detachably connected.

FIG. 6E is a schematic structural diagram of the fixed bottom plate F11 of the hidden vehicle-borne radar mounting assembly F100 according to an embodiment of the present invention. As shown in FIG. 6E, in the present embodiment, the fixed bottom plate F11 includes a flat plate portion F111 and a plurality of connecting legs F112 located at a periphery of the flat plate portion F111.

Each connecting leg F112 extends towards the target vehicle body and is connected with the connecting support F12. As shown in FIG. 6B, the connecting leg F112 and the connecting support F12 are partially overlapped and connected by a bolt, and after the connecting support F12 is fixed on the target vehicle body, the fixed bottom plate F11 and the connecting support F12 can be connected by a fastener, and assembly is convenient.

The present invention further provides a vehicle including the hidden vehicle-borne radar mounting assembly F100 according to any one or combinations of the above embodiments.

The hidden radar mounting assembly is mounted on the vehicle, the radar enclosure F20 with the radar can be turned out of the vehicle when the radar is required to be used, so as to expose the emission end from the window F21 of the radar enclosure F20, and the radar enclosure F20 is restored to the position inside the vehicle when the radar is not required to be used, thus guaranteeing the attractiveness of the appearance of the vehicle.

In an embodiment, the radar mounting assembly is further provided with the sealing assembly F30 following the radar enclosure F20, such that the sealing assembly can adapt to the turnover radar enclosure F20, so as to achieve the real-time waterproof sealing effect. In addition, since the sealing film F31 of the sealing assembly F30 is communicated with the drain pipe of the vehicle, and the communicated position is the lowest position of the sealing film F31 when the radar enclosure F20 is in the closed state, accumulated water can be drained in the closed state, and the sealing film F31 is prevented from being soaked in water for a long time.

FIG. 7A is a schematic diagram of an assembled structure of a mounting device according to an embodiment of the present invention and a vehicle. As shown in FIG. 7A, the present invention provides a mounting device for a vehicle-borne radar G30, which is mounted at a preset mounting opening of a vehicle body G200. In an embodiment, the mounting device includes a fixed structure G10, a radar cover shell G20, and a driving assembly. The fixed structure G10 is fixedly provided on a side of the vehicle body G200 close to the inside of a vehicle and forms a sunken mounting space together with the mounting opening. The fixed structure G10 here may be a structure composed of a plurality of supports, or may be a container-like structure, which is not limited herein. The radar cover shell G20 is provided on a top surface of the vehicle-borne radar G30, fixedly connected with the vehicle-borne radar G30 and configured to protect the vehicle-borne radar G30, and the radar cover shell G20 is matched with the mounting opening. The driving assembly is configured to drive the radar cover shell G20 and the vehicle-borne radar G30 to move or rotate together, so as to form a use state where the vehicle-borne radar G30 is exposed outside the vehicle and an emission end of the vehicle-borne radar is not shielded, or a closed state where the vehicle-borne radar G30 is hidden inside the vehicle.

In the present embodiment, the vehicle-borne radar G30 capable of moving relative to the vehicle body G200 is designed, the driving assembly is provided on the vehicle body G200 and configured to drive the vehicle-borne radar G30 or the radar cover shell G20 to extend out or turn out of the vehicle when the radar is required to be used, and the vehicle-borne radar G30 can be hidden in the vehicle when the vehicle-borne radar G30 is not required to be used, such that the problems that an appearance of a fixed exposed vehicle-borne radar G30 is not attractive, aerodynamics is influenced due to changing a shape of the vehicle, and dust is prone to be accumulated can be solved.

In an embodiment, a driving mechanism for the vehicle-borne radar G30 is further provided to realize the turnover of the vehicle-borne radar G30 relative to the vehicle body G200. FIG. 7C is a schematic structural diagram of the driving assembly of the mounting device according to an embodiment of the present invention. As shown in FIG. 7C, in an embodiment, one side of the vehicle-borne radar G30 is pivotally connected with the vehicle body G200, such that the vehicle-borne radar G30 can rotate around a target rotating shaft relative to the vehicle body G200; for example, a shell of the vehicle-borne radar G30 in FIG. 7C is provided with a connecting arm G31, and the connecting arm G31 is rotatably connected with the vehicle body G200 through a rotating shaft G32. The vehicle-borne radar G30 has a mounting side surface G301 perpendicular to the target rotating shaft; for example, when a side of pivotable connection of the vehicle-borne radar G30 with the vehicle body G200 is a rear side of the vehicle-borne radar G30, the mounting side surface G301 may be a left or right side surface of the vehicle-borne radar G30. As shown in FIG. 7C, the driving assembly includes a movable sliding block G40, a connecting rod G50 and a cam plate G60. The movable sliding block G40 is configured to reciprocate along a first straight line parallel to the mounting side surface G301; for example, an operable mechanical structure is provided to be connected with the movable sliding block G40, and the movable sliding block G40 can be pushed to move when the mechanical structure is operated; or a driving motor is provided to drive the movable sliding block G40 to move. The connecting rod G50 has one end hinged to the movable sliding block G40 through a first hinge shaft G401 and the other end provided with a second hinge shaft G501. The cam plate G60 is fixedly connected with the mounting side surface G301 and provided with a moving sliding groove G601, an included angle between an extending direction of the moving sliding groove G601 and the first straight line is an acute angle, and the second hinge shaft G501 is located in the moving sliding groove G601. Specifically, as shown in FIG. 7C, the included angle between the moving sliding groove G601 and the first straight line near a pivoting side is an acute angle, such that the vehicle-borne radar G30 can be driven to rotate clockwise and counterclockwise when the movable sliding block G40 moves left and right, so as to expose the vehicle-borne radar G30 out of the vehicle or hide the vehicle-borne radar G30 in the vehicle.

In an embodiment, the driving assembly further includes a first power source connected with the movable sliding block G40 and configured to drive the movable sliding block G40 to reciprocate along the first straight line. The first power source may be connected with a control unit of the vehicle, so as to drive the vehicle-borne radar G30 to be turned over according to a control instruction of the vehicle.

As shown in FIG. 7C, in the present embodiment, the driving assembly further includes a lead screw G70 and a second power source G80. The lead screw G70 extends along the first straight line and is in a lead screw G70 pair connection with the movable sliding block G40. The second power source G80 is connected with the lead screw G70 and configured to drive the lead screw G70 to rotate, so as to drive the movable sliding block G40 to move relative to the lead screw G70. The power source here may be a motor which outputs a torque, and the motor may also be connected with the control unit of the vehicle, so as to controllably drive turnover of the vehicle-borne radar G30.

In the present embodiment, by providing the lead screw G70 forming the lead screw G70 pair connection with the movable sliding block G40, power output by the second power source G80 can be transmitted to the vehicle-borne radar G30 more stably, and the vehicle-borne radar G30 can be turned over more stably, thus facilitating an increase of user satisfaction.

In an embodiment, as shown in FIG. 7C, the lead screw G70 and the second power source G80 are mounted at the fixed structure G10.

FIG. 7D is a schematic structural diagram of an inner sealing film G91 and a connecting pipe G912 of the mounting device according to an embodiment of the present invention. As shown in FIG. 7D, in the present embodiment, the mounting device further includes the soft inner sealing film G91, and as shown in FIG. 7A, the inner sealing film G91 has one side hermetically connected with a periphery of the radar cover shell G20 and the other side hermetically connected with a bottom of the vehicle body G200 at the mounting opening, so as to form a sealed space between the radar cover shell G20 and the vehicle body G200. A width of the inner sealing film G91 is configured into a preset size to adapt to a stroke change of rotation or movement of the radar cover shell G20, and here, the width of the inner sealing film G91 is a distance from a position of connection with the vehicle body G200 to a position of connection with the radar cover shell G20. The stroke change caused by the movement of the radar cover shell G20 can be met by adopting the inner sealing film G91 which can be stretched or folded.

In the present embodiment, by providing the inner sealing film G91 between the radar cover shell G20 and the vehicle body G200, liquid outside the vehicle can be effectively prevented from entering the mounting device or the vehicle, thereby achieving a waterproof effect to protect the radar and parts inside the vehicle.

In an embodiment, the vehicle-borne radar G30, the fixed structure G10 and the driving assembly are all located at a lower portion of the inner sealing film G91 or a side of the inner sealing film apart from the radar cover shell G20. As shown in FIG. 7B, the radar cover shell G20 has a preset height which may be about a half of a height of the mounting space, and thus, after the inner sealing film G91 is mounted, a space isolated from the outside is formed at a lower side and an outer side of the inner sealing film G91, and the vehicle-borne radar G30, the fixed structure G10, the driving assembly, or the like, may be placed in the space.

In another embodiment, a lowest position of the inner sealing film G91 when the mounting device is in the use state or the closed state is provided with a water outlet G911 communicated with the outside. That is, liquid in the inner sealing film G91 can be automatically discharged when the mounting device is in the use state or the closed state, so as to prevent aging or damage of the inner sealing film G91 caused by long-term water accumulation.

As shown in FIG. 7D, in an embodiment, the mounting device further includes an extendable and retractable connecting pipe G912 having two ends communicated with the water outlet G911 and a drainage system of the vehicle respectively. Since the inner sealing film G91 can follow the motion of the radar cover shell G20, by providing the extendable and retractable connecting pipe G912, on the premise that the original drainage system of the vehicle is not changed, the accumulated water in the inner sealing film G91 can be discharged by the drainage system, and an original structure of the vehicle is effectively and reasonably used.

FIG. 7B is a partial enlarged view of A in FIG. 7A. In another embodiment, as shown in FIG. 7B, the mounting device further includes an outer sealing strip G92 fixedly provided at an edge of the mounting opening and having one side abutting against the radar cover shell G20 when the mounting device is in the closed state. In a further embodiment, the mounting device further includes a mounting support G93 provided on an inner side of the vehicle body G200 at the mounting opening and hermetically connected with the vehicle body G200, for example, connected with the vehicle body G200 by double-sided adhesive tape G94. A side of the mounting support G93 apart from the vehicle body G200 is connected with the inner sealing film G91, for example by bonding. An end of the mounting support G93 close to the radar cover shell G20 is configured to fix the outer sealing strip G92. As shown in FIG. 7B, the outer sealing strip G92 has one side abutting against the radar cover shell G20 and the other side abutting against the vehicle body G200, and the flexible sealing strip can realize hermetical connection therebetween.

In the present embodiment, the outer sealing strip G92 is further provided, such that an effective sealing effect can be achieved when the mounting device is in the closed state, the liquid outside the vehicle is prevented from entering the space between the inner sealing film G91 and the radar cover shell G20, thus further enhancing the sealing effect.

Further, at this point, the water outlet G911 is provided at the lowest position of the inner sealing film G91 when the mounting device is in the closed state, such that when the mounting device is in the use state, the outer sealing strip G92 cannot stop external rainwater, the rainwater enters the inner sealing film G91, a certain amount of water is accumulated in the inner sealing film G91, but does not exceed the water outlet G911, and when the mounting device is in the closed state, the water in the inner sealing film G91 is not accumulated, the external rainwater is blocked by the outer sealing film, and the mounting device can be guaranteed not to retain accumulated water. Therefore, an omnidirectional waterproof effect on the mounting device can be achieved through the cooperation of the outer sealing strip G92, the inner sealing film G91 and the water outlet G911.

In an embodiment, another driving mechanism capable of realizing turnover of the radar relative to the vehicle body is further provided. FIG. 8A is a schematic structural diagram of a turnover radar device H100 according to an embodiment of the present invention. As shown in FIG. 8A, in an embodiment, the turnover radar device H100 is mounted at a preset mounting opening H201 of a vehicle body H200, and the turnover radar device H100 includes a radar box H10 and a driving assembly. The radar box H10 is configured to place a radar therein and located at the mounting opening H201. The driving assembly includes a driving source H21, a lifting rod H22 and a supporting arm H23, one end of the lifting rod H22 is hinged to a target side wall H101 of the radar box H10 (see hinged point A in FIG. 8A), and the driving source H21 is configured to drive the lifting rod H22 to move along a preset direction, so as to push the radar box H10 to move towards the outside of the vehicle at the hinged point of the lifting rod H22 and the radar box H10; the preset direction here can be perpendicular to a plane where the mounting opening H201 is located, or if the turnover radar device H100 is provided on a roof, the preset direction can be perpendicular to an outer surface of the vehicle body H200 or can be a vertical direction of the vehicle, as long as the radar box H10 can be pushed towards the outside of the vehicle to expose the radar box H10 outside the vehicle. The supporting arm H23 has one end hinged to the vehicle body H200 (see hinged point B in FIG. 8A) and the other end hinged to the target side wall H101 (see hinged point C in FIG. 8A), and is configured to lift the radar box H10 out of the mounting opening H201 together with the lifting rod H22; the supporting arm H23 here may be provided parallel to the target side wall H101 and configured to assist the lifting of the radar box H10.

In the present embodiment, the turnover radar device H100 is provided, and the function that the radar on the vehicle extends out of the vehicle or is hidden in the vehicle is achieved through the driving assembly. The specific driving assembly includes the lifting rod H22 driven by the driving source H21 to ascend/descend and the supporting arm H23 for auxiliary supporting, and the radar box H10 for loading the radar can be lifted relative to the vehicle; the driving assembly has a simple structure, realizes multi-point supporting, can realize and guarantee normal lifting of the radar box H10, and meets the requirement of providing a hidden radar on the vehicle. The problems of an unattractive appearance, a poor aerodynamic performance, a poor detection angle, dust accumulation, or the like, caused by fixedly mounting the radar on the vehicle are solved.

As shown in FIG. 8A, in the present embodiment, the driving assembly further includes a lead screw sleeve H24 fixedly connected with the target side wall H101, the lifting rod H22 is a lead screw connected with the lead screw sleeve H24 through a lead screw pair, the driving source H21 is a first motor outputting a torque, and the first motor is connected with the lead screw and configured to drive the lead screw to rotate.

In the present embodiment, the lead screw is driven by the first motor to rotate, the rotation of the lead screw is converted into the lifting of the lead screw sleeve H24 through the lead screw pair, and the lead screw sleeve H24 is connected with the radar box H10, so as to drive the radar box H10 to ascend/descend; the torque of the motor can be stably converted into the lifting of the radar box H10 through the transmission mode of the lead screw pair, and the stable lifting of the radar box H10 is realized in conjunction with the auxiliary lifting function of the supporting arm H23.

In a further embodiment, the hinged point of the lifting rod H22 and the target side wall H101 and a hinged point of the supporting arm H23 and the target side wall H101 are located on both sides of the target side wall H101 in a lateral direction respectively. As shown in FIG. 8A, the left side shows a front end of the vehicle, the right side shows a rear end of the vehicle, the upper portion shows a portion above the vehicle, a left side wall of the radar box H10 here serves as the target side wall H101, the lifting rod H22 and the supporting arm H23 are provided on the left side wall, and by controlling a distance between the hinged point of the lifting rod H22 and the target side wall H101 and the hinged point of the supporting arm H23 and the target side wall H101, the two hinged points are provided on two sides of the target side wall H101 respectively; that is, a front end and a rear end of the left side wall can better support the radar box H10, such that a supporting effect of the driving assembly is better.

In another embodiment, two supporting arms H23, that are aligned with each other, are provided at the target side wall H101 and a side wall of the radar box H10 opposite to the target side wall H101 respectively. When the target side walls H101 are the left side wall and a right side wall of the radar box H10, two supporting arms H23 that are aligned with each other may be arranged at the left side wall and the right side wall respectively, one lifting rod H22 and one driving source H21 are still used and may be located at the left side wall or the right side wall, the arrangement of the two supporting arms H23 further improves supporting stability during the lifting process, and one driving source H21 reduces a cost while a lifting action is realized.

Certainly, in other embodiments, two driving sources H21 and two lifting rods H22 may be provided, synchronous actions of the two driving sources H21 are kept to realize synchronous lifting of the two lifting rods H22, and in this case, the lifting of the radar box H10 is more stable, but the cost is increased accordingly, including a cost of a control system in addition to a cost of the driving source H21.

In another embodiment, the driving source H21 is a second motor for outputting a linear motion, and is configured to drive the lifting rod H22 to move in the preset direction. The driving mode that the lifting rod H22 is directly driven by the second motor to ascend/descend has simpler structural connection. Further, a structure for guiding the lifting rod H22 may be provided on the target side wall H101 here and configured to restrict a moving direction of the lifting rod H22.

In another embodiment, the turnover radar device H100 further includes a fixed base (not shown) fixedly connected with the vehicle body H200 and configured to place the driving source H21. Since a position of the driving source H21 is required to be correspondingly set according to a position of the lifting rod H22, and the position of the driving source may not have a corresponding vehicle body structure for direct connection, the fixed base is provided and connected with the vehicle body H200, and the fixed base can have a certain space span to indirectly connect the driving source H21 and the vehicle body H200, so as to better support and connect the driving source H21.

In an embodiment, the radar box H10 has a first side surface and a second side surface opposite to each other, as well as a third side surface and a fourth side surface opposite to each other, the first side surface is provided with an opening configured to expose the emission end of the radar, and the target side wall H101 is the third side surface or the fourth side surface. As shown in FIG. 8A, when the target side walls H101 are the left and right side walls of the radar box H10, an opening may be provided in a front side wall of the radar box H10, and due to the arrangement of the opening, the emission end of the radar can work without obstruction and will not be shielded. Certainly, the arrangement of the opening here has a premise that a side wall is provided at a front portion of the radar box H10, and in other embodiments, a radar box H10 without a side wall at the front portion may be provided, and at this point, the opening is not required to be provided. Certainly, when the radar is mounted at a fender, a rear portion of the vehicle, or the like, a direction of the opening should be adjusted accordingly.

The present invention further provides a vehicle including the turnover radar device H100 according to any one or combinations of the above embodiments.

The turnover radar device is mounted on the vehicle, and the function that the radar on the vehicle extends out of the vehicle or is hidden in the vehicle is achieved through the driving assembly. The specific driving assembly includes the lifting rod H22 driven by the driving source H21 to ascend/descend and the supporting arm H23 for auxiliary supporting, and the radar box H10 for loading the radar can be lifted relative to the vehicle; the driving assembly has a simple structure, realizes multi-point supporting, can realize and guarantee normal lifting of the radar box H10, and meets the requirement of providing a hidden radar on the vehicle.

FIG. 8B is a connection block diagram of a radar control system of the vehicle and the turnover radar device H100 according to an embodiment of the present invention. As shown in FIG. 8B, in an embodiment, the vehicle further includes the radar control system. The radar control system includes a switch key H300, an infotainment host H400 and an electronic control unit H500 which are connected in sequence. The switch key H300 generates a corresponding electric signal in response to an external operation and sends the signal to the infotainment host H400, and the switch key H300 may be a physical key of an instrument board or a touch function key on a vehicle-borne display screen. The infotainment host H400 processes the electric signal into corresponding radar control information and sends the radar control information to the electronic control unit H500, and the electronic control unit H500 is connected with the driving source H21 and configured to control the driving source H21 to execute corresponding actions according to the radar control information.

In the present embodiment, the driving source H21 of the turnover radar device H100 is connected with the electronic control unit H500 of the vehicle, the switch key H300 is correspondingly provided, the signal of the switch key H300 is processed by the infotainment host H400 to form the corresponding radar control information, and the radar control information is sent to the electronic control unit H500 to realize automatic lifting and restoring of the turnover radar device H100; that is, automatic control of the turnover radar device H100 is realized, and a user can conveniently control the radar.

The electronic control unit H500 here may be a controller of the radar, and since control of a working state of the radar also requires a corresponding controller, the controller of the radar can be shared by the turnover function as a new function, only corresponding program setting is required, and a hardware cost is not increased.

In an embodiment, a driving mechanism for lifting the radar is further provided. FIG. 9 is a schematic diagram of an assembly structure of a lifting vehicle-borne radar device according to an embodiment of the present invention and a target vehicle body I40. As shown in FIG. 9, the present embodiment provides a lifting vehicle-borne radar device including a radar I10, a lifting mechanism I20 and a sealing film I30. The radar I10 has a shape matched with a shape of a mounting opening on the target vehicle body I40, the radar I10 has a radar emission opening on a side surface thereof. The target vehicle body I40 here may be a vehicle body structure where the radar I10 is required to be mounted, such as a vehicle body roof, a side wing, or the like. The lifting mechanism I20 is connected with the radar I10 and configured to controllably lift the radar I10 to hide the radar I10 in the vehicle body or raise the radar to a preset height through the mounting opening. The lifting mechanism I20 here can be any lifting mechanism in the prior art, such as a hydraulic lifting mechanism I20. The sealing film I30 is provided around the radar I10 and has one side connected with an edge of the mounting opening and the other side connected with the radar I10, and a connecting point of the sealing film I30 and a side of the radar I10 having the radar emission opening (not shown) is located below a bottom of the radar emission opening, thus ensuring that when the radar I10 is raised to the preset height, the radar emission opening thereof is not shielded by the sealing film I30.

The radar I10 in the present embodiment can be lifted relative to the target vehicle body I40, and the sealing film I30 is provided and can achieve a real-time sealing and waterproof effect in the process of lifting the radar I10, thus meeting a waterproof requirement of the liftable radar.

As shown in FIG. 9, in an embodiment, the lifting mechanism I20 includes a driving motor I21 and a transmission mechanism, and the transmission mechanism includes a lead screw I22, a first sliding block I231, a second sliding block I232, a first connecting rod I24 and a second connecting rod I25. A side surface of the radar I10 is provided with a sliding groove I101, and a length direction of the sliding groove I101 is parallel to an axial direction of the lead screw I22. The driving motor I21 is configured to drive the lead screw I22 to rotate. The first sliding block I231 and the second sliding block I232 are connected with the lead screw I22 through lead screw pairs. The first connecting rod I24 has one end hinged to the first sliding block I231 by a first rotating shaft I201 and the other end hinged to a third rotating shaft I203, and the third rotating shaft I203 is slidably provided in the sliding groove I101 of the radar I10. A middle of the second connecting rod I25 is hinged to a middle of the first connecting rod I24 through a fourth rotating shaft I204, the second connecting rod I25 has one end hinged to the second sliding block I232 through a second rotating shaft I202 and the other end hinged to a fifth rotating shaft I205, the fifth rotating shaft I205 is slidably provided in the sliding groove I101, and axes of the first rotating shaft I201, the second rotating shaft I202, the third rotating shaft I203, the fourth rotating shaft I204 and the fifth rotating shaft I205 are perpendicular to a plane where the first connecting rod I24 and the second connecting rod I25 are located.

During working, the driving motor I21 rotates forwards to drive the lead screw I22 to rotate, and the first sliding block I231 and the second sliding block I232 are caused to move towards each other, such that the first connecting rod I24 rotates in a clockwise direction in the page, the second connecting rod I25 rotates in a counterclockwise direction in the page, and therefore, heights of tops of the first connecting rod I24 and the second connecting rod I25 are increased, and the first connecting rod I24 and the second connecting rod I25 lift the radar I10 together. When the driving motor I21 rotates reversely, actions of the components are opposite to the actions in the above process under a similar principle, and are not repeated herein.

In the present embodiment, transmission is performed through the motor and the lead screw I22 pair, thus guaranteeing lifting stability of the radar I10; the first connecting rod I24 and the second connecting rod I25 are linked by hinging, thereby achieving a powerful supporting effect on the radar I10.

In an embodiment, the sliding groove I101 is provided on an outer side surface of the radar I10 not provided with the radar emission opening. For example, the radar emission opening is provided on a front side of the radar I10, and the sliding groove I101 is provided on a left, right, or rear side surface of the radar I10.

In another embodiment, two transmission mechanisms are provided and symmetrically arranged on two opposite side surfaces of the radar I10. The lifting mechanism I20 further includes a gear assembly (not shown) provided between the lead screw I22 of each transmission mechanism and the driving motor I21. That is, the gear assembly may include a plurality of gears meshed with each other, the gear connected with the driving motor I21 serves as a driving gear, and a driven gear meshed with the driving gear is connected with the lead screw I22.

In the present embodiment, one driving motor I21 drives two lead screws I22 to rotate at the same time, such that the first connecting rod I24 and the second connecting rod I25 on two opposite side surfaces of the radar I10 are driven to move, and the radar I10 is driven to ascend/descend; the lifting mechanism I20 with the layout can realize the lifting of the radar I10 more stably, and when one lead screw I22 pair fails, the radar I10 can still be driven to ascend/descend continuously.

In another embodiment, two transmission mechanisms and two driving motors I21 are provided, the two transmission mechanisms are symmetrically provided on two opposite side surfaces of the radar I10, and the two driving motors I21 are connected with the lead screws I22 of the two transmission mechanisms respectively.

In the present embodiment, two driving sources are designed, and can drive the two lead screws I22 to move respectively, such that the function of lifting the radar I10 can be still guaranteed when one driving motor I21 fails.

In a further embodiment, the driving motor I21 is connected with a controller of the vehicle. The driving motor I21 is controlled through signals of the controller, automatic control of lifting of the radar I10 can be realized, and particularly after the controller is connected with keys of an instrument board, a user can control lifting of the radar I10 by operating the keys, thereby facilitating maintenance and checking of the radar I10.

In an embodiment, the sealing film I30 is provided with a drain pipe (not shown) communicated with the outside. Since the sealing film I30 is flexible, it is easy to accumulate water therein, and the accumulated water can be drained by providing the drain pipe, so as to avoid influences of dampness on components of the lifting vehicle-borne radar device.

The present invention further provides a vehicle including the lifting vehicle-borne radar device according to any one or combinations of the above embodiments.

In another embodiment, the lifting of the radar can also be realized by a driving mechanism in the following embodiments. FIG. 10A is a schematic diagram of an assembly structure of a liftable radar device in a closed state according to an embodiment of the present invention and a vehicle body J10. FIG. 10B is a schematic diagram of an assembly structure of the liftable radar device in a use state according to an embodiment of the present invention and the vehicle body J10. The present invention provides a liftable radar device for a vehicle, a vehicle body J10 of the vehicle is provided with a vehicle body opening J101 (see FIG. 10A) for the liftable radar device to pass through, and the vehicle body J10 is any vehicle body structure where a radar is required to be provided. As shown in FIG. 10A, in an embodiment, the liftable radar device includes a radar assembly, a lifting mechanism J30 and a cleaning mechanism J40 (see FIG. 10B). The radar assembly includes a radar body and a radar housing J20 fixedly connected with the radar body. The lifting mechanism J30 is configured to drive the radar assembly to ascend/descend, so as to realize a use state (see FIG. 10B) where the radar assembly is raised to a first height and a mirror surface of the radar body is exposed or a closed state (see FIG. 10A) where the radar assembly is lowered to a second height; here, the mirror surface of the radar body refers to a signal emission end, and the lifting mechanism J30 may be any one of structures in the prior art for realizing lifting, such as a hydraulic lifting mechanism J30, an electrically controlled telescopic mechanism, or the like. The lifting mechanism J30 can drive the radar body or the radar housing J20 alternatively. The cleaning mechanism J40 is configured to clean the mirror surface of the radar body when the radar assembly is in the use state. The use state here only indicates the state where the radar assembly is raised to the first height, and does not refer to a working state that the radar body is required to be used for detection, and cleaning often occurs when detection is not required; for example, when the mirror surface is not clean, the mirror surface is cleaned by using the cleaning mechanism J40 before detection; certainly, if the mirror surface is suddenly contaminated during detection of the radar body, for example, if muddy water is scattered on the mirror surface, the radar assembly is also in the use state at this point, and the cleaning mechanism J40 can be temporarily controlled to perform timely cleaning.

The present embodiment provides the liftable radar assembly which can extend out of the vehicle body according to use requirements. In addition, the liftable radar device is further provided with the cleaning mechanism J40 dedicated to the radar body, such that the mirror surface of the radar body can be cleaned when the radar assembly is raised, thereby keeping cleanliness of the mirror surface of the radar, ensuring that the radar body can collect clear information, and then facilitating an improvement of precision of intelligent driving, for example, accuracy of vehicle positioning and target object collection.

As shown in FIG. 10A, in an embodiment, the lifting mechanism J30 includes two folding arms and a driving source J33. The two folding arms are oppositely provided on a same side surface of the radar housing J20, each folding arm includes a first connecting rod J30 and a second connecting rod J32 which are hinged, the first connecting rod J30 is further hinged to the radar housing J20, and the second connecting rod J32 is further hinged to the vehicle body J10. The driving source J33 is configured to drive the two second connecting rods J32 to rotate oppositely to each other, so as to drive the radar assembly to ascend/descend. The driving source J33 here can be two motors which are connected with hinge shafts of the two second connecting rods J32 and the vehicle body J10 respectively, and are configured to drive the two second connecting rods J32 to rotate in two opposite directions.

The lifting mechanism J30 including the two folding arms in the present embodiment has a simple structure and stable lifting.

In another embodiment, the driving source J33 is a motor, and the lifting mechanism J30 further includes a gear set J34 having an input end connected with the motor and an output end connected with the two second connecting rods J32; here, the output end can be two rotating shafts or gears with opposite rotation directions, and if the output end is rotating shafts, the rotating shafts can be directly connected with the second connecting rods J32, and if the output end is gears, gears meshed with the gears of the output end can be provided on the hinge shafts of the second connecting rods J32 and the vehicle body J10.

In a further embodiment, each second connecting rod J32 is connected with the vehicle body J10 through a rotating shaft, the rotating shaft is fixedly connected with the second connecting rod J32, and the rotating shaft can rotate relative to the vehicle body J10. The gear set J34 includes a driving gear provided at an output shaft of the motor and a driven gear meshed with the driving gear and having a same number of teeth as the driving gear, the output shaft of the motor is connected with one rotating shaft, and the driven gear is fixedly connected with the other rotating shaft.

In the present embodiment, power of one motor can be output to the two second connecting rods J32 by providing the gear set J34, such that the radar assembly can be lifted at a low cost.

FIG. 10C is a front view of the radar housing J20 of the liftable radar device according to an embodiment of the present invention. As shown in FIG. 10C, in an embodiment, the radar housing J20 has a box shape, and one side of the radar housing is provided with a visible window J201 for exposing the mirror surface of the radar body. Certainly, in other embodiments, the radar housing J20 may be in a shape of a cover, such that the side of the radar body provided with the mirror surface is directly exposed, and the visible window J201 is not required to be provided.

In a further embodiment, as shown in FIG. 10B, an opening J202 is further provided on the side of the radar housing J20 provided with the visible window J201. The cleaning mechanism J40 includes an extendable and retractable nozzle J41 provided inside the radar housing J20 corresponding to the opening J202, and the nozzle J41 is configured to pass through the opening J202 to spray cleaning liquid to the mirror surface. The nozzle J41 can be connected with a telescopic mechanism which controllably controls the extending/retracting of the nozzle J41. As shown in FIG. 10B, in an embodiment, two openings J202 are provided and arranged on two sides of the visible window J201 respectively.

The present invention further provides a vehicle including the liftable radar device according to any one or combinations of the above embodiments.

The liftable radar assembly is mounted on the vehicle, and can extend out of the vehicle body J10 according to use requirements. In addition, the liftable radar device is further provided with the cleaning mechanism J40 dedicated to the radar body, such that the mirror surface of the radar body can be cleaned when the radar assembly is raised, thereby keeping cleanliness of the mirror surface of the radar, ensuring that the radar body can collect clear information, and then facilitating the improvement of the precision of intelligent driving, for example, accuracy of vehicle positioning and target object collection.

In an embodiment, another driving mechanism for lifting the radar is further provided. FIG. 11A is a schematic structural diagram of a radar system K100 for a vehicle according to an embodiment of the present invention, and FIG. 11B is a schematic structural diagram of a turnover mechanism K20 in the radar system K100 for a vehicle according to an embodiment of the present invention. As shown in FIGS. 11A and 11B, in a specific embodiment, the radar system K100 for a vehicle includes a bottom plate K40, a radar box K10, a turnover mechanism K20 and a driving mechanism K30, the bottom plate K40 is connected with a vehicle body K200, a radar K11 is mounted in the radar box K10, and the radar box K10 is provided on a side of the bottom plate K40 facing the outside of the vehicle. The turnover mechanism K20 includes a first turnover support K21 and a fixed support K22, the fixed support K22 has one end fixedly connected with the bottom plate K40 and the other end pivotally connected with the radar box K10, and one end of the first turnover support K21 is connected with the radar box K10. The driving mechanism K30 is configured to drive the first turnover support K21 to push the radar box K10 to rotate around a connecting point of the fixed support K22 and the radar box K10, such that the radar box K10 is switched between an exposed state where the radar K11 is exposed outside the vehicle and a hidden state where the radar K11 is hidden inside the vehicle. Here, the radar box K10 may be mounted on a roof, and in other embodiments, the radar box K10 may be mounted elsewhere in the vehicle. The radar K11 may be a laser radar.

In the present embodiment, the radar box K10 can be in the exposed state when the radar K11 is required to be used, the radar box K10 can be in the hidden state when the radar K11 is not required to be used, attractiveness of the vehicle will not be influenced, and meanwhile, when the radar box K10 is hidden, the radar K11 can be prevented from being stolen, damaged and dirtied.

FIG. 11C is a schematic structural diagram of the turnover mechanism K20 in the radar system K100 for a vehicle according to another embodiment of the present invention, and FIG. 11D is a schematic perspective diagram of the turnover mechanism K20 in the radar system K100 for a vehicle according to an embodiment of the present invention. As shown in FIGS. 11C and 11D, in another embodiment, the turnover mechanism K20 further includes a second turnover support K23 having a first end and a second end, the first end is fixedly connected with the radar box K10 and pivotally connected with the fixed support K22 through a connecting point, and the second end is connected with an end of the first turnover support K21 connected with the radar box K10. Compared with the technical solution in which the second turnover support K23 is not provided, in the present embodiment, by providing the second turnover support K23, labor is saved, and output power of the driving mechanism K30 can be properly reduced.

In an embodiment, the second turnover support K23 is triangular, and the second turnover support K23 further includes a third end, and the third end is fixedly connected with the radar box K10. Specifically, the first end and the third end are both located on a side of the second end facing the roof By configuring the second turnover support K23 to be triangular, stability of the second turnover support K23 can be provided, and turnover of the radar box K10 is better facilitated.

In other embodiments, the turnover mechanism K20 further includes a third turnover support K24 having one end pivotally connected with the first turnover support K21 and the other end connected with the driving mechanism K30, so as to drive the first turnover support K21 to rotate when the driving mechanism K30 drives the third turnover support K24 to rotate, thereby pushing the radar box K10 to rotate.

In an embodiment, the driving mechanism K30 is a motor, and the third turnover support K24 is connected with an output shaft of the motor. The output shaft of the motor rotates to drive the third turnover support K24 to rotate, and the first turnover support K21 is then driven to rotate, so as to push the radar box K10 to rotate around the connecting point, such that the radar K1 is exposed out of the vehicle body K200. In other embodiments, the driving mechanism K30 can alternatively be configured as other driving parts, such as a lead screw, or the like.

In an embodiment, the radar system K100 for a vehicle further includes a sealing structure K50 provided along a circumferential direction of the radar box K10 and configured to seal a gap between the radar box K10 and the vehicle body K200, and the arrangement of the sealing structure K50 can prevent rainwater, dust, or the like, from entering the vehicle.

In a preferred embodiment, the radar system K100 for a vehicle further includes a cleaning mechanism provided inside the radar box K10 and configured to extend out of the radar box K10 when the radar box K10 is in the exposed state, so as to clean the outside of the radar box K10. The radar system according to the present embodiment has a cleaning function, and the radar box K10 can be cleaned automatically, thus improving intelligence of the radar system for a vehicle.

In an embodiment, the cleaning mechanism includes two cleaning nozzles K60, the two cleaning nozzles K60 are provided on two sides of the radar K11 respectively, and when the outside of the radar box K10 or the mirror surface of the radar K11 is required to be cleaned, the cleaning nozzles K60 are controlled to extend out of the radar box K10, and a cleaning system is controlled to be started for cleaning.

In an embodiment, the radar system K100 for a vehicle further includes a detection unit and a control unit connected with each other, the detection unit is configured to detect whether the mirror surface of the radar K11 is dirty and transmit a signal to the control unit when detecting that the mirror surface of the radar K11 is dirty and detection precision is affected, and the control unit controls the two cleaning nozzles K60 to extend out of the radar box K10, and controls an electromagnetic valve on a water supply channel to be opened to clean the mirror surface of the radar K11.

The present invention further provides a vehicle having the radar system K100 for a vehicle according to any one of the above embodiments mounted thereon. The radar system K100 for a vehicle is not repeated herein.

In the present embodiment, when it is necessary for the vehicle to use the radar K11, by starting the motor, the third turnover support K24, the first turnover support K21 and the second turnover support K23 are driven to rotate in sequence by the output shaft of the motor, so as to drive the radar box K10 to rotate out of the vehicle, thereby exposing the radar K100 to perform detection. When it is not necessary for the vehicle to use the radar K11, the motor is controlled to rotate reversely, such that the radar box K10 is rotated to an original position to hide the radar K11.

The present embodiment proposes the hidden radar system K100 for a vehicle, the radar K11 is arranged inside the radar box K10 which can be opened movably, and accessories, such as the cleaning mechanism, the sealing structure K50, or the like, are integrated into the radar box K10. On the one hand, the radar system K100 for a vehicle has no influence on static styling of the whole vehicle, and on the other hand, the radar system K100 for a vehicle is not influenced by a styling surface of the vehicle, and by adjusting the turnover mechanism K20, the radar K11 can obtain a better detection angle, which better facilitates optimization of subsequent detection of intelligent driving.

In one or more embodiments of the present invention, the following driving mechanism may be used to realize radar lifting. FIG. 12A is a schematic diagram of a lifting device for a hidden roof laser radar according to an embodiment of the present invention. FIG. 12B is a schematic diagram of a position of the opened lifting device for a hidden roof laser radar according to an embodiment of the present invention. In an embodiment, as shown in FIG. 12A or 12B, a lifting device for a hidden roof laser radar mainly includes a motor L1 and a moving device L2 linked with the motor L1, and the moving device L2 is configured to drive a radar device L3, such that the radar device L3 can ascend or descend; the laser radar is provided in the radar device L3.

The moving device L2 includes a driving rod L20, a restraint plate L21 and a rotating member L22, and the driving rod L20 is fixedly connected with the motor L1, configured to move with the motor L1, and fitted with a first anchoring shaft L31 provided on the radar device L3 for linking, such that the radar device L3 moves under the driving of the driving rod L20. The restraint plate L21 is provided on a radar integrated box bottom plate L4, and a restraint strip hole L210 is formed in the restraint plate L21 and configured to constrain a motion track of the first anchoring shaft L31 to allow the first anchoring shaft L31 to move along a preset direction. One end of the rotating member L22 is hinged to the radar device L3, the other end of the rotating member L22 is hinged to the radar integrated box bottom plate L4, and when the driving rod L20 is driven by the motor L1 to push the first anchoring shaft L31 to slide in the restraint strip hole L210, the rotating member L22 rotates at the same time to raise the radar device L3 to an open position (see FIG. 12B) exposed outside the vehicle or lower the radar device L3 to a closed position (see FIG. 12A) hidden inside the vehicle.

In the present embodiment, by providing connecting rod and cam mechanisms, such as the driving rod L20, the restraint plate L21 and the first anchoring shaft L31, a structure is simple and reliable; a rotating angle of the radar device L3 is changed by the rotating member L22, such that the radar device L3 can be raised or lowered according to preset requirements, thereby meeting requirements of the radar for a working environment.

Further, the first anchoring shaft L31 and the driving rod L20 are linked, such that an overall motion structural mode is concise; constraining is performed through the restraint strip hole L210, such that the whole motion process is stable, thus facilitating stable working of the radar device L3.

In an embodiment, as shown in FIG. 12A, the driving rod L20 is provided with a strip-shaped hole L200, and the first anchoring shaft L31 is provided in the strip-shaped hole L200 and slides in the strip-shaped hole L200. Furthermore, a design of the strip-shaped hole L200 or a strip-shaped groove 200 can be determined according to a thickness of the driving rod L20 in a design process, the strip-shaped hole L200 and the strip-shaped groove 200 both meet design requirements as long as the first anchoring shaft L31 can slide in the strip-shaped hole L200, and therefore, the design is simpler, more convenient and more reliable.

In a further embodiment, as shown in FIGS. 12A and 12B, one end of the driving rod L20 is fixedly connected with a transmission shaft L10, and rotatably connected with the radar integrated box bottom plate L4 through the transmission shaft L10, and the motor L1 is configured to drive the transmission shaft L10 to rotate, so as to drive the driving rod L20 to rotate, such that the driving rod L20 and the radar integrated box bottom plate L4 generate relative rotation to drive the radar device L3 to ascend or descend.

In an embodiment, as shown in FIGS. 12A and 12B, the restraint plate L21 is provided between the driving rod L20 and the radar device L3, and the restraint strip hole L210 has an arc shape; furthermore, two ends of the restraint strip hole L210 serve as limiting ends, the upper end of the restraint strip hole serves as an opening limiting end L2101, and the lower end of the restraint strip hole serves as a closing limiting end L2102; when the radar device L3 is raised to the opening limiting end L2101, which indicates that the radar device L3 is opened in place, the motor L1 stops operating, and the radar device L3 is kept at the open position; when the radar device L3 is required to be lowered for hiding, the motor L1 works reversely, such that the driving rod L220 runs reversely to drive the radar device L3 to descend, and the motor L1 stops operating until the radar device is lowered to the closing limiting end l2102, and the radar device L3 is hidden and protected.

It should be noted that the restraint plate L21 can be provided on an outer side of the driving rod L20, the restraint strip hole L210 can be configured as a restraint groove L210, and a same technical effect can be achieved as long as the first anchoring shaft L31 can move along a restraint trajectory.

In an embodiment, as shown in FIGS. 12A and 12B, the radar device L3 is provided with a second anchoring shaft L32, the second anchoring shaft L32 is sleeved with the rotating member L22, the radar integrated box bottom plate L4 is provided with a rotating shaft L41, and the rotating shaft L41 is sleeved with the rotating member L22, such that the radar device L3 rotates around the rotating shaft L41, thereby enabling the radar device L3 to ascend or descend.

In another embodiment, two moving devices L2 are provided and symmetrically arranged on two opposite sides of the radar device L3; for example, the left side in FIG. 12A shows a front side of the radar device L3, the front side shows an emission end of the laser radar, and then the moving devices L2 can be provided on left and right sides of the radar device L3; stability of movement of the radar device L3 can be guaranteed better by mounting the moving devices on both sides.

The present invention further discloses a radar integrated box including a radar device L3 and the above lifting device for a hidden roof laser radar.

The present invention further discloses a vehicle including the above radar integrated box.

It is to be understood that the various embodiments described above may be combined with one another.

For example, in the above embodiments, implementations of various radar boxes, various cleaning devices, cleaning structures, cleaning mechanisms, or the like, having the cleaning function, various lifting structures, lifting devices, lifting mechanisms, or the like, for lifting the radar, and various sealing structures, sealing devices, sealing mechanisms, or the like, have been described. It is to be understood that the present invention is not limited thereto.

Any one or more of the above radar boxes, any one or more of the cleaning devices, cleaning structures, cleaning mechanisms, or the like, any one or more of the lifting structures, lifting devices, lifting mechanisms, or the like, and any one or more of the sealing structures, sealing devices, sealing mechanisms, or the like, may be combined with one another. Even if there exists that an embodiment of a certain feature is only combined with a certain feature in the above description of the embodiment, the certain feature can still be combined with corresponding features in other embodiments according to the comprehensive understanding of the specification and the drawings of the specification, and the combined technical solutions are still within the protection scope of the present invention.

So far, those skilled in the art should be aware that, although exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A roof radar integrated box mounted at a preset mounting opening of a vehicle body, comprising:
a fixed structure fixedly provided on a side of the vehicle body close to the inside of a vehicle and forming a sunken mounting space together with the mounting opening;
a vehicle-borne radar mounted in the mounting space;
a radar cover shell provided on a top surface of the vehicle-borne radar, fixedly connected with the vehicle-borne radar and configured to protect the vehicle-borne radar, the radar cover shell being matched with the mounting opening; and
a driving assembly configured to drive the radar cover shell and the vehicle-borne radar to move or rotate together, so as to form a use state where the vehicle-borne radar is exposed outside the vehicle and an emission end of the vehicle-borne radar is not shielded, or a closed state where the vehicle-borne radar is hidden inside the vehicle;
wherein the vehicle-borne radar has one side pivotally connected with the vehicle body, such that the vehicle-borne radar can rotate relative to the vehicle body about a target pivot axis, the vehicle-borne radar has a mounting side surface perpendicular to the target pivot axis, and the driving assembly comprises:
a movable sliding block configured to be reciprocally movable along a first straight line parallel to the mounting side surface;
a connecting rod having one end hinged to the movable sliding block through a first hinge shaft and the other end provided with a second hinge shaft;
a cam plate fixedly connected with the mounting side surface and provided with a moving sliding groove, an included angle between an extending direction of the moving sliding groove and the first straight line being an acute angle, and the second hinge shaft being located in the moving sliding groove;
a first lead screw extending along the first straight line and in a lead screw pair connection with the movable sliding block; and
a second power source connected with the first lead screw and configured to drive the first lead screw to rotate, so as to drive the movable sliding block to move relative to the first lead screw.

2. The roof radar integrated box according to claim 1, further comprising a soft inner sealing film having one side hermetically connected with a periphery of the radar cover shell and the other side hermetically connected with a bottom of the vehicle body at the mounting opening, so as to form a sealed space between the radar cover shell and the vehicle body, a width of the inner sealing film being configured into a preset size to adapt to a stroke change of rotation or movement of the radar cover shell.

3. The roof radar integrated box according to claim 2, wherein the vehicle-borne radar, the fixed structure and the driving assembly are all located at a lower portion of the inner sealing film or a side of the inner sealing film apart from the radar cover shell.

4. The roof radar integrated box according to claim 2, wherein a lowest position of the inner sealing film when the roof radar integrated box is in the use state or the closed state is provided with a water outlet communicated with the outside.

5. The roof radar integrated box according to claim 2, further comprising an extendable and retractable connecting pipe having two ends communicated with the water outlet and a drainage system of the vehicle respectively.

6. The roof radar integrated box according to claim 2, further comprising an outer sealing strip fixedly provided at an edge of the mounting opening and having one side abutting against the radar cover shell when the roof radar integrated box is in the closed state.

7. The roof radar integrated box according to claim 6, further comprising a mounting support provided on an inner side of the vehicle body at the mounting opening and hermetically connected with the vehicle body, a side of the mounting support apart from the vehicle body being connected with the inner sealing film, and an end of the mounting support close to the radar cover shell being configured to fix the outer sealing strip.

8. The roof radar integrated box according to claim 1, further comprising:
a sensor provided in the radar cover shell and configured to sense a moving target within a preset range around the vehicle; and
at least one light source provided on the radar cover shell, connected with the sensor and configured to be controllably turned on when the sensor senses the moving target.

9. The roof radar integrated box according to claim 8, further comprising a camera provided in the radar cover shell to controllably extend out of the radar cover shell when a camera cover plate is opened, so as to photograph a mirror surface of the vehicle-borne radar.

10. The roof radar integrated box according to claim 1, further comprising a cleaning device configured to be controllably started to clean the vehicle-borne radar, wherein the cleaning device comprises a nozzle being extendable and retractable.

11. The roof radar integrated box according to claim 10, wherein the cleaning device comprises a housing having a duct provided therein, one end of the duct being connected with a water supply device, and the other end of the duct being connected with the nozzle;

the nozzle is located in the housing when the cleaning device is in an off state, and at least part of the nozzle extends out of the housing when the cleaning device is in a water spraying state.

12. The roof radar integrated box according to claim 11, wherein a sliding block is provided on the nozzle, and a sliding groove fitted with the sliding block is formed in the housing, such that the sliding block slides along the sliding groove when a water pressure in the duct reaches a preset water pressure, thereby causing the nozzle to extend out of the housing.

13. A vehicle comprising the roof radar integrated box according to claim 1.

14. A roof radar integrated box mounted at a preset mounting opening of a vehicle body, comprising:

a fixed structure fixedly provided on a side of the vehicle body close to the inside of a vehicle and forming a sunken mounting space together with the mounting opening;

a vehicle-borne radar mounted in the mounting space;

a radar cover shell provided on a top surface of the vehicle-borne radar, fixedly connected with the vehicle-borne radar and configured to protect the vehicle-borne radar, the radar cover shell being matched with the mounting opening;

a driving assembly configured to drive the radar cover shell and the vehicle-borne radar to move or rotate together, so as to form a use state where the vehicle-borne radar is exposed outside the vehicle and an emission end of the vehicle-borne radar is not shielded, or a closed state where the vehicle-borne radar is hidden inside the vehicle; and a soft inner sealing film having one side hermetically connected with a periphery of the radar cover shell and the other side hermetically connected with a bottom of the vehicle body at the mounting opening, so as to form a sealed space between the radar cover shell and the vehicle body, a width of the inner sealing film being configured into a preset size to adapt to a stroke change of rotation or movement of the radar cover shell.

* * * * *